United States Patent
Al Sayeed et al.

(10) Patent No.: US 10,536,235 B2
(45) Date of Patent: Jan. 14, 2020

(54) LOGICAL CONTROL SEAMS IN OPTICAL NETWORKS TO IMPROVE RESTORATION SPEED OR TIMING FOR CAPACITY ADDS

(71) Applicant: Ciena Corporation, Hanover, MD (US)

(72) Inventors: Choudhury A. Al Sayeed, Stittsville (CA); David W. Boertjes, Nepean (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/255,119

(22) Filed: Jan. 23, 2019

(65) Prior Publication Data

US 2019/0173602 A1 Jun. 6, 2019

Related U.S. Application Data

(63) Continuation-in-part of application No. 16/036,014, filed on Jul. 16, 2018, now Pat. No. 10,237,011, which is a continuation of application No. 15/586,911, filed on May 4, 2017, now Pat. No. 10,050,737.

(51) Int. Cl.
*H04B 10/00* (2013.01)
*H04J 14/02* (2006.01)
*H04B 10/27* (2013.01)
*H04B 10/03* (2013.01)

(52) U.S. Cl.
CPC ............ *H04J 14/021* (2013.01); *H04B 10/03* (2013.01); *H04B 10/27* (2013.01); *H04J 14/0221* (2013.01)

(58) Field of Classification Search
CPC combination set(s) only.
See application file for complete search history.

(56) References Cited

U.S. PATENT DOCUMENTS

| | | | |
|---|---|---|---|
| 5,442,544 A | 8/1995 | Jelinek | |
| 6,522,803 B1 * | 2/2003 | Nakajima | H04Q 11/0005 385/24 |
| 7,444,078 B1 | 10/2008 | Stango et al. | |
| 7,826,748 B2 | 11/2010 | Yang et al. | |
| 7,873,274 B2 | 1/2011 | Collings et al. | |
| 7,894,721 B2 | 2/2011 | Roberts et al. | |
| 7,983,560 B2 | 7/2011 | Maki et al. | |

(Continued)

OTHER PUBLICATIONS

Aggarwal et al., A Self-Tuning Analog Proportional-Integral-Derivative (PID) Controller, 2006, IEEE, pp. 1-8.

(Continued)

*Primary Examiner* — Agustin Bello
(74) *Attorney, Agent, or Firm* — Clements Bernard PLLC; Christopher L. Bernard; Lawrence A. Baratta, Jr.

(57) ABSTRACT

Systems and methods include, in a controller, responsive to a request to add one or more channels to a path in an optical network which has in-service channels, determining a plurality of logical control seams to split the path, wherein the path includes a plurality of optical sections and each logical control seam has a boundary at an associated optical section; determining controller speed for each of the plurality of logical control seams based on corresponding optical margin; and performing, for each of the plurality of logical control seams, control at the determined controller speed to add the one or more channels with the in-service channels.

20 Claims, 24 Drawing Sheets

(56) References Cited

U.S. PATENT DOCUMENTS

| | | | |
|---|---|---|---|
| 8,077,384 B2 * | 12/2011 | Mori | H04B 10/2935 359/334 |
| 8,095,008 B2 | 1/2012 | Collings et al. | |
| 8,135,280 B2 * | 3/2012 | Zong | H04B 10/07955 398/34 |
| 8,160,446 B2 | 4/2012 | Collings et al. | |
| 8,260,141 B2 | 9/2012 | Berg | |
| 8,364,036 B2 | 1/2013 | Boertjes et al. | |
| 9,258,190 B2 | 2/2016 | Swinkels et al. | |
| 9,276,696 B2 | 3/2016 | Al Sayeed et al. | |
| 9,344,191 B2 | 5/2016 | Al Sayeed et al. | |
| 9,806,803 B2 | 10/2017 | Bownass et al. | |
| 9,831,947 B2 | 11/2017 | Boertjes | |
| 9,853,762 B2 | 12/2017 | Evans et al. | |
| 2002/0191241 A1 | 12/2002 | Emery et al. | |
| 2003/0058497 A1 | 3/2003 | Park et al. | |
| 2006/0018658 A1 | 1/2006 | Mori | |
| 2007/0014571 A1 * | 1/2007 | Roberts | H04B 10/0793 398/25 |
| 2007/0269215 A1 * | 11/2007 | Sugaya | H04J 14/0221 398/95 |
| 2008/0285973 A1 * | 11/2008 | Uchiyama | H04B 10/07955 398/83 |
| 2009/0116837 A1 | 5/2009 | Boertjes et al. | |
| 2010/0091355 A1 * | 4/2010 | Ota | H04B 10/291 359/337 |
| 2010/0104276 A1 | 4/2010 | Komaki | |
| 2010/0202777 A1 * | 8/2010 | Liu | H04J 14/0204 398/83 |
| 2010/0221004 A1 | 9/2010 | Haslam et al. | |
| 2011/0176802 A1 * | 7/2011 | Callan | H04B 10/296 398/38 |
| 2011/0200324 A1 | 8/2011 | Boertjes et al. | |
| 2011/0222846 A1 | 9/2011 | Boertjes et al. | |
| 2011/0222851 A1 | 9/2011 | Berg | |
| 2011/0222862 A1 | 9/2011 | Boertjes et al. | |
| 2011/0268442 A1 | 11/2011 | Boertjes et al. | |
| 2011/0274425 A1 | 11/2011 | Grobe | |
| 2013/0279918 A1 * | 10/2013 | Mizutani | H04L 12/12 398/135 |
| 2015/0117858 A1 | 4/2015 | Al Sayeed et al. | |
| 2015/0229404 A1 | 8/2015 | Boertjes et al. | |
| 2015/0229528 A1 | 8/2015 | Swinkels et al. | |
| 2015/0333824 A1 | 11/2015 | Swinkels et al. | |
| 2015/0333862 A1 | 11/2015 | Swinkels et al. | |
| 2015/0333864 A1 | 11/2015 | Swinkels et al. | |
| 2016/0020852 A1 * | 1/2016 | Bato | H04B 10/296 398/34 |
| 2016/0050470 A1 | 2/2016 | Swinkels et al. | |
| 2016/0072575 A1 * | 3/2016 | Al Sayeed | H04J 14/0289 398/2 |
| 2016/0285545 A1 * | 9/2016 | Schmidtke | H04B 10/038 |
| 2017/0264981 A1 * | 9/2017 | Wiktor | H04B 10/27 |
| 2018/0241466 A1 * | 8/2018 | Inagaki | H04B 10/07 |
| 2018/0343077 A1 * | 11/2018 | Al Sayeed | H04J 14/021 |
| 2019/0098382 A1 * | 3/2019 | Wiktor | H04B 10/27 |
| 2019/0173602 A1 * | 6/2019 | Al Sayeed | H04J 14/021 |

OTHER PUBLICATIONS

PID Theory Explained, Mar. 29, 2011, pp. 1-4.

ITU-T, Telecommunication Standardization Sector of ITU, G.694.1, Spectral grids for WDM applications: DWDM frequency grid, Feb. 2012, pp. 1-16.

ITU-T, Telecommunication Standardization Sector of ITU, G.698.2, Amplified multichannel dense wavelength division multiplexing applications with single channel optical interfaces, Nov. 2009, pp. 1-38.

* cited by examiner

| Path Routing | Path Margin | Path Allowable Offset (±) | Controller Settings |
|---|---|---|---|
| I-J | 5dB | 6dB | Set_4 |
| I-E-B-L-C-F-J | 1dB | 2dB | Set_2 |
| I-E-B-G-H-C-F-J | 3dB | 4dB | Set_3 |

*FIG. 9A*

| Local Node | I | | |
|---|---|---|---|
| Remote Node | J | | |
| Mesh-restorable Photonic Service | #1 | | |
| Restoration Priority | High | | |
| Restoration Controller Settings | Fastest Convergence Time | | |
| Reversion Controller Settings | Path-appropriate | | |
| Path Label | Routing | Path-appropriate Controller Settings | Service Priority Overwrite Controller Settings |
| Home Path | I-J | Set_4 | Set_4 |
| Restoration Path_1 | I-E-B-L-C-F-J | Set_2 | Set_4 |
| Restoration Path_2 | I-E-B-G-H-C-F-J | Set_3 | Set_4 |

*FIG. 9B*

LOGICAL CONTROL SEAMS IN OPTICAL NETWORKS TO IMPROVE RESTORATION SPEED OR TIMING FOR CAPACITY ADDS

CROSS-REFERENCE TO RELATED APPLICATION(S)

The present application/patent is a continuation-in-part of U.S. patent application Ser. No. 16/036,014, filed Jul. 16, 2018, and entitled "METHODS AND APPARATUS FOR PRE-PROGRAMMING LAYER-0 SERVICE TURN UP SPEEDS FOR PHOTONIC SERVICE PROVISIONING OR RESTORATION," which claims priority as a continuation of U.S. patent application Ser. No. 15/586,911, filed May 4, 2017 (now U.S. Pat. No. 10,050,737 which issued on Aug. 14, 2018), and entitled "METHODS AND APPARATUS FOR PRE-PROGRAMMING LAYER-0 SERVICE TURN UP SPEEDS FOR PHOTONIC SERVICE PROVISIONING OR RESTORATION," the contents of which are incorporated by reference herein.

FIELD OF THE DISCLOSURE

This present disclosure relates to optical networking, and in particular, relates to systems and methods for Layer-0 (photonic) path restoration and Layer-0 path provisioning. More particularly, the present disclosure relates to systems and methods that increase pre-programmed restoration speeds by taking full advantage of available Signal-to-Noise (SNR) margins per spans on the path.

BACKGROUND OF THE DISCLOSURE

Layer-0 failure recovery is important in optical networking. Best in class optical networking deployments provide automatic failure recovery With increasing demands for bandwidth in optical networks, optical networking technologies are evolving to transmit more bits per second (bps) over optical links. The optical spectrum employed has been standardized such as in ITU-T Recommendation G.694.1 (June 2002) "Spectral Grids for WDM Applications: DWDM Frequency Grid" and ITU-T Recommendation G.698.2 (November 2009) "Amplified Multichannel DWDM Applications with Single Channel Optical Interfaces," the contents of which are incorporated by reference herein. The optical spectrum can be segmented into transmission windows at different wavelengths such as a "C band" which is from about 1530 to about 1565 nm and which corresponds to the gain bandwidth of Erbium Doped Fiber Amplifiers (EDFAs). Other transmission windows can include an "L band" (from about 1565 to about 1625 nm), an "S band" (from about 1460 to about 1530 nm), etc. Conventionally, Dense Wavelength Division Multiplexed (DWDM) networks typically use a fixed bandwidth (e.g., 25, 50, 100, or 200 GHz) centered on the ITU grid (i.e., center channel wavelength/frequency) for each channel. This can be referred to as a "gridded DWDM optical spectrum," i.e., each channel occupies a spot on the grid in an associated transmission window. However, with higher number of bits per second being conveyed (especially beyond 100 Gbps), it is getting increasingly complex to fit channels within a fixed slotted spectral bandwidth. Allocating larger bandwidth channels is required for high baud rate signals, allocation which cannot respect the fixed grid ITU spectrum. Accordingly, there is a movement towards "gridless" or flexible DWDM spectrum where the (slot) width of the channels is flexible and/or variable (i.e., the slot width is uncertain before a slot is allocated), also known as flex grid. Optimal spectrum utilization or spectral mining is another reason to move towards flexible spectrum solutions where more channels can be grouped together without guard bands in between, groups which can potentially occupy the full DWDM spectral bandwidth. For comparisons, whereas in a conventional gridded system each channel has a predetermined bandwidth, i.e. 25, 50, 100, or 200 GHz, in flexible spectrum systems each channel has a variable bandwidth of N GHz, where N can be any amount of bandwidth and can be different for each channel.

FIG. 1 is a graph showing an example of a flexible spectrum 10 employed in an optical system. The flexible spectrum 10 illustrated includes four channels 12, 14, 16, 18. The first two channels 12, 14 occupy 50 GHz of bandwidth (wide) each with guard bands 20 (spaces) therebetween. For clarity, a conventional gridded system using 50 GHz spacing would include each channel on the optical spectrum being similar to channels 12, 14 shown. However, employing flexible spectrum, third channel 16 occupies 400 GHz (width) and can be, for example, a 2 Tbps signal. The fourth channel 18 is a 4×100 Gbps signal with each of the 100 Gbps signals occupying 37.5 GHz (width) for a total of 150 GHz (width). Channels 16, 18 can be referred to as 'super' channels and will be more common as more advanced modulation techniques are utilized to increase the number of bits per second conveyed.

In conventional gridded systems, adding, or deleting a single channel has minimal impact on other existing in-service channels particularly when there are many such channels in such gridded systems; the guard spaces help. However, capacity change (i.e., adding or deleting a channel) has significantly more impact in flexible spectrum networks since such capacity change is no longer adding one channel among many as in gridded systems, but could be adding or deleting a significant portion of the spectrum. For example, adding or deleting either channel 16, 18 (with limited guard space) will have significant impact on in-service channels 12, 14.

However, it is highly desirable, in either fixed grid or flexible grid optical systems, particularly while adding new bandwidth capacity along an optical path for lighting new photonic services to provide the additional bandwidth capacity without impairing the performance of existing photonic services already on that optical path. Conversely, while deleting bandwidth capacity along an optical link, in either fixed grid or flexible grid optical systems, extinguishing photonic services cannot impair the performance of remaining provisioned services on that optical link.

The time taken to complete restoration of a photonic service to a protection path is constrained partly due to optical hardware limitations to achieve a stable light output, and mostly due to the requirement of making only non-service affecting capacity changes on non-faulted optical links providing the restoration path. For clarity, per channel actuators in optical hardware can light up additional wavelengths relatively fast (typically in milliseconds) to provision a photonic service, however doing so each newly lit channel can create spectral gain cross-talk in neighboring in-service channels.

When new optical signals (photonic services) are added to a path, due to changes in spectral loading over each optical link, the change triggers multiple physical effects which can result in a change in power and Optical Signal to Noise Ratio (OSNR) levels of pre-existing channels. Such physical effects imparted to existing channels are primarily caused by at least one of the following three factors:

Amplifier gain ripple and tilt: Different spectral loadings will result in different power gains at different frequencies over the spectrum;

Stimulated Raman Scattering (SRS) effect which appears especially with high per channel launch powers; and Spectral Hole Burning (SHB) effect which creates a photonic energy starving hole in the spectrum at the output of EDFAs which becomes more prevalent in low spectral loaded scenarios since the holes tend to disappear under heavy pumping levels.

A cumulative effect from all the factors highlighted above contributes to physical power level perturbations (glitches) experienced by existing provisioned photonic services, which unchecked can either result in undershoots causing lower OSNR for existing photonic services or overshoots causing non-linear impairments to neighboring photonic services. The magnitude of such physical perturbations further depends on the number of amplifiers in the optical path across the optical network and the spectral placement of the existing and newly added channels along the optical path.

FIGS. 2A, 2B, 3A and 3B illustrate examples of conventional Spectral Hole Burning (SHB) effects affecting existing photonic services due to an addition change in capacity.

FIGS. 2A and 2B show an example of the SHB effect on the power level of a pre-existing optical channel provisioned in an optical link (along an optical path). The in-service channel is represented by the power level signal peak above (Amplified Spontaneous Emission) ASE light background in FIG. 2A with some negative tilt applied. The existing in-service channel is provisioned at a target power shown in dashed line. While a group of channels is added in an energy starved portion of the spectrum, the power level of the existing channel(s) can overshoot as shown in FIG. 2B. With the amplifier over-gained due to compensation at the spectral hole, the power in the spectral hole is over-represented. This results in the existing in-service channel being over-powered.

FIGS. 3A and 3B show another example of the SHB effect on the power level of a pre-existing optical channel provisioned in a link (along an optical path). The in-service channel is provisioned at target power (shown in dashed line) in a low ASE light portion of the spectrum in FIG. 3A with some negative tilt applied. While a group of channels is added in an energy starved portion of the spectrum, the power level of the existing channel(s) can undershoot as shown in FIG. 3B. With the amplifier over-gained due to compensation of the spectral hole, the power in the spectral hole is over-represented. This (and the negative tilt) results in the existing in-service channel being under-powered.

In general, depending on where an existing in-service channel is located in the optical spectrum and depending where a channel is added in the spectrum different impairments can be experienced by the existing in-service channel. For certainty, while not shown, deleting a channel can and often does have an impairment on other existing in-service channels. In this sense, while per channel actuators in optical hardware can switch on additional wavelengths fast (typically in milliseconds), doing so can create spectral gain cross-talk (power glitches) in neighboring in-service channels.

The activation of per-channel actuators is typically slowed down in a controlled way to switch on in seconds instead of milliseconds. Examples of such methods include U.S. Pat. No. 9,344,191 entitled "Systems and Methods for Capacity Changes in DWDM Networks Including Flexible Spectrum Systems" issued May 17, 2016, the entirety of which is incorporated herein by reference. In brief, when adding (or restoring) channels to an optical path, the controllers need to consider the potential physical impairments on existing channels by: adding small increments of power for adding channels in the desired part of the spectrum, slowing down to monitor the power impairments on existing channels if any, and nullifying those impairments before adding more power into the spectrum. U.S. Pat. No. 9,344,191 describes a photonic controller configured to switch and move per channel actuators from one attenuation level to another in seconds, controller which employs live feedback data from optical per channel power monitors adding additional overheads for adding or deleting capacities in a network.

Therefore, capacity changes in an optical transmission line system remain a challenge. In particular, there is a need to improve optical path restoration functionality.

Further, conventional approaches do not consider the fact that the margin impact by control speeds is not uniform across a path, i.e., the SNR margin impact on existing in-service channels on a path due to power offsets created by a faster control speed on that path may not be the same over the entire path if channel population or spectral loading condition varies along the path.

BRIEF SUMMARY OF THE DISCLOSURE

While also present in Layer-0 photonic service provisioning, the above capacity change problems become even more apparent in providing Layer-0 restoration in an optical network deployment without optical protection switches despite restoration paths being known a priori.

FIG. 4 illustrates a simplified DWDM optical mesh network deployment for example supporting fixed grid or flexible spectrum photonic services. A number of Optical Add/Drop Multiplexer (OADM) nodes 50 are illustrated to provide physical layer connectivity via optical links 52 while the control (layer) plane includes a centralized control plane server 54 controlling sectional controllers (not shown) in each OADM node 50. Dotted links illustrate logical control connections to the control plane server 54 typically provisioned out-of-band over additional connections (not illustrated).

It is understood that the fiber spools 52 shown are very schematic, physical optical links can for example also include sequential erbium doped fiber amplifiers (EDFAs) 66 between fiber spans; only a few of which are shown/labeled. An optical path 56 is originally provisioned in the mesh network between the OADM 50A and the OADM 50B over three optical links 52 along the upper portion of the optical mesh network 50A→50H→50E→50B with the signal being added to and dropped from each optical link 52 at OADM nodes 50. Optical path 62B is provisioned to share link 52 between OADM nodes 50E and 50B with optical path 56. The provisioning of the in-service optical path 56 includes reserving a corresponding protection optical path 58 in the mesh network between OADM nodes 50A and 50B over five optical links 52 along the lower portion 50A→50C→50D→50F→50G→50B of the optical mesh network. This is the sense in which the protection path is said to be a priori known. Optical path 62B is provisioned to share sequential optical links 52 between nodes 50B→50G→50F with protection path 58, while optical path 62A is provisioned to share sequential optical links 52 between nodes 50F→50D→50C with protection path 58. The in-service configuration includes photonic services being lit as provisioned along the in-service optical paths 56, 62A and 62B, and dark along the protection optical path 58. It is understood that in an actual optical mesh network additional protection optical paths are reserved over additional photonic services elsewhere in the optical network but not shown solely for simplicity of description herein.

As soon as a fiber break, illustrated as the heavy cross 60, (or fiber related equipment failure) is detected in the mesh network, the Layer-0 control plane server 54 signals all OADM nodes 50A, 50H, 50E and 50B on the affected in-service optical path 56 to perform a delete of faulted photonic services which involves closing-down per channel actuators. Of note, on the optical section link 52 between nodes 50H and 50E adjacent to the detected fiber break 60, since all channels on that link 52 are already affected, closing down the actuators in one step as part of the delete action process between nodes 50H and 50E does not cause any additional performance impact (delete is not service affecting on that link). However, on the optical section links 52 between nodes 50A and 50H and 50E and 50B, a delete action with (one-step) actuator closing can be service affecting as mentioned hereinabove for example service affecting to optical path 62B. As the delete completes, the protection channel(s) is(are) restored on the protection path 58, typically using a sequential turn up of per channel actuators at each OADM node 50A, 50C, 50D, 50F, 50G and 50B along the lower portion of the optical mesh network. Similar to the delete action, if each photonic controller per optical section simply ramps to the given power target for all channels (in one single step), that can potentially be traffic impacting for other services running on that network sharing the same path or at least sharing an optical section within that path, for example optical paths 62A and 62B actively carrying in-service photonic services.

For clarity, per section photonic controllers, that have channels traversing all over the network with highly diversified topologies, do not have the end-to-end view of: the per channel operating Signal to Noise Ratio (SNR) margin, the total accumulated power fluctuations nor steady-state power offset each individual channel can tolerate. Without considering an end-to-end view on the performance impact of existing services in the mesh network that may take place if an aggressive ramp-up approach is taken, the photonic controllers along the protection path have to be cautious and conservative to follow a typical slow approach for making capacity changes per OADM section. In other words, such layer-0 restoration from failure is a slow by being reactive typically taking 10's of seconds to complete, the delay in restoring grows with the number of channel actuators along the path (six illustrated in FIG. 4).

While FIG. 4 illustrates a mesh network, it would be understood that the concepts and operating principles presented herein apply equally to linear and optical ring networks or the like.

It has been discovered that the above identified shortcomings can be alleviated by proactively estimating available margins of all pre-existing photonic services along a protection optical path, services which can potentially be impacted by aggressive controller ramp ups (or slew rate) in any OADM section along the protection path. In general, in accordance with the proposed solution the available margins are proactively estimated along the protection path of each provisioned photonic service. In some embodiments the available margins along all protection optical paths in the mesh network are proactively estimated; for example, in some implementations at the control plane server 54.

In accordance with the proposed solution, the available margin of existing services is employed as a deciding factor to select the optimal restoration speed for directing optical section controllers to change capacities on the affected photonic service paths, and hence, improve the overall restoration speed, or the timing for capacity adds in a network. In general, optical section controllers are directed to change capacities on multiple photonic service paths restoring photonic services affected by the fiber break.

In some embodiments, the proposed method pre-analyses these results and pre-saves path-appropriate optical section controller settings (such as slew rate, convergence time, controller coefficients) ahead of time so that at the time of restoration, the control plane can apply those settings to corresponding OADM photonic controllers to improve a non-service affecting restoration response at improved speed.

In some implementations, the proposed method also provides per photonic service restoration speed settings which can over-write path-appropriate controller settings if necessary, at the time of restoration.

In accordance with the proposed solution, as the network controller adds new photonic services in the optical network, the network controller can ensure that the actual physical capacity change process remains non-service affecting to existing photonic services actively carrying traffic (along the provisioned paths).

In accordance with an aspect of the proposed solution there is provided a method of changing photonic service capacity along an optical transport path in an optical network, the method comprising: determining first available margins of all existing first services actively provisioned along the optical transport path according to a then present optical loading condition along the optical transport path; readjusting each first available margin by a first additional margin penalty each first active service would incur when the photonic service capacity would be changed along the optical transport path; obtaining a path margin from the readjusted first available margins; determining a maximum path allowable power offset from the path margin; and obtaining photonic controller settings which would generate less than the maximum allowable path allowable power offset for all first active services along the transport path during the photonic service capacity change.

In accordance with another aspect of the proposed solution there is provided a method of changing photonic service capacity along an optical transport path in an optical network, wherein the transport path is used to restore the faulted photonic service provisioned along the faulted photonic service path having remaining operational optical sections, for each optical section remaining in-service the method further comprising: determining second available margins of all existing second services actively provisioned along the optical section according to a then present optical loading condition along the faulted optical transport path; readjusting each second available margin by a second additional margin penalty each second active service would incur when the faulted photonic service would be removed from the optical section; obtaining an optical section margin from the readjusted second available margins; determining a maximum optical section allowable power offset from the optical section margin; and obtaining photonic controller settings which would generate less than the maximum allowable optical section allowable power offset for all second active services on the optical section.

In accordance with a further aspect of the proposed solution there is provided a control plane server for provisioning and monitoring photonic services in an optical network, for each photonic service capacity change the control plane server being configured to: determine available margins of all existing services actively provisioned along the optical transport path according to a then present optical loading condition along the optical transport path; readjust each available margin by an additional margin penalty each active service would incur when the photonic service capacity would be changed along the optical transport path; obtain a path margin from the readjusted available margins; determine a maximum path allowable power offset from the path margin; and obtain photonic controller settings which would generate less than the maximum allowable path allowable power offset for all active services along the transport path during the photonic service capacity change

BRIEF DESCRIPTION OF THE DRAWINGS

The present disclosure is illustrated and described herein with reference to the various drawings, in which like reference numbers are used to denote like system components/method steps, as appropriate, and in which:

FIGS. 9A and 9B are schematic diagrams illustrating data sets produced by methods and systems in accordance with some implementations of the proposed solution;

DETAILED DESCRIPTION OF THE DISCLOSURE

In accordance with an embodiment of the proposed solution, pre-programming of path-appropriate Layer-0 restoration parameters is provided considering available margin of all existing services to provide improved speed of restoration.

In accordance with an implementation of the proposed solution, network administrators and/or other control planes are enabled to pre-program service specific Layer-0 restoration speed parameters that can over-write path-appropriate restoration set up on photonic actuators regardless of restoration paths or other existing services.

In accordance with another embodiment, the core pre-programming restoration speed concept is enhanced to pre-program restoration speeds by taking full advantage of available SNR margins per spans on the path instead of just considering the minimum SNR margins along the path. At least one or more logical control seam(s) or boundaries are created over a path, where for each logical seam, control speed can be decided to respect the available margin within that seam, and control actions for restorations or capacity changes are sequenced from one seam to the next. A heuristic is proposed to minimize the total restoration time across the entire path.

Pre-Programmed Layer-0 Restoration Speed

Figure 1:
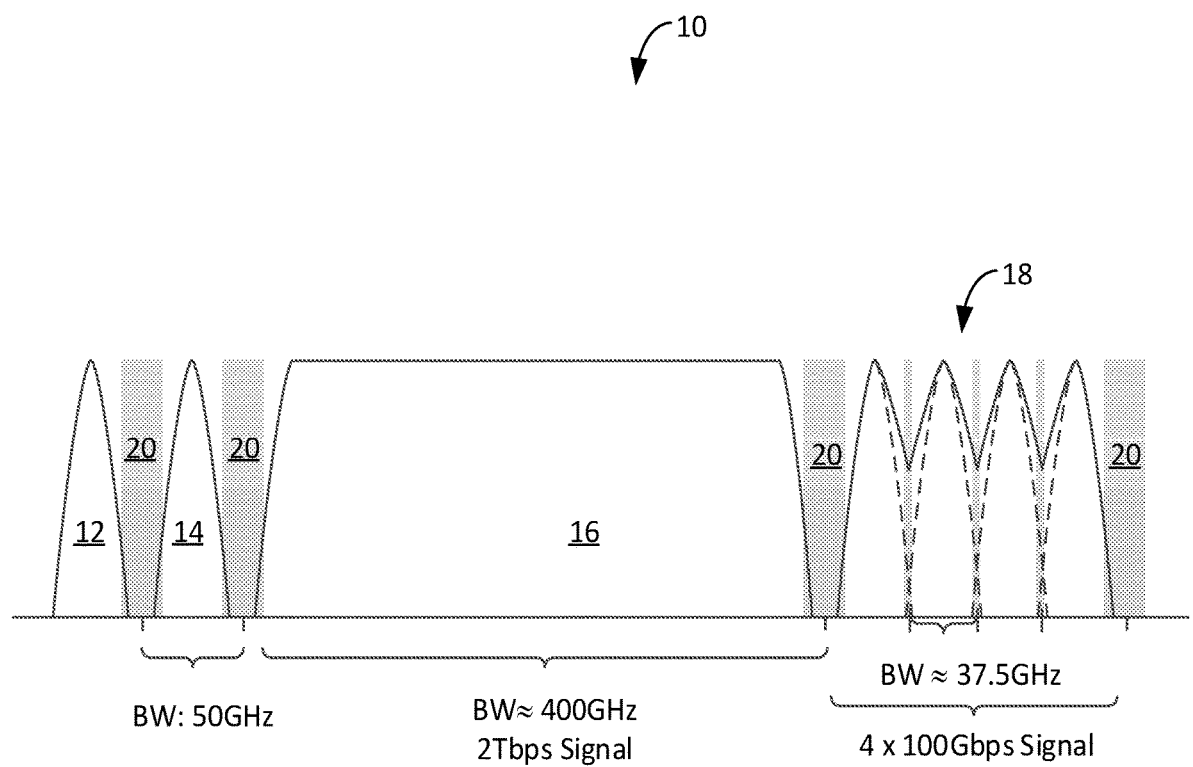
FIG. 1 is a graph of optical spectrum of a flexible spectrum system.
Figure 2A:
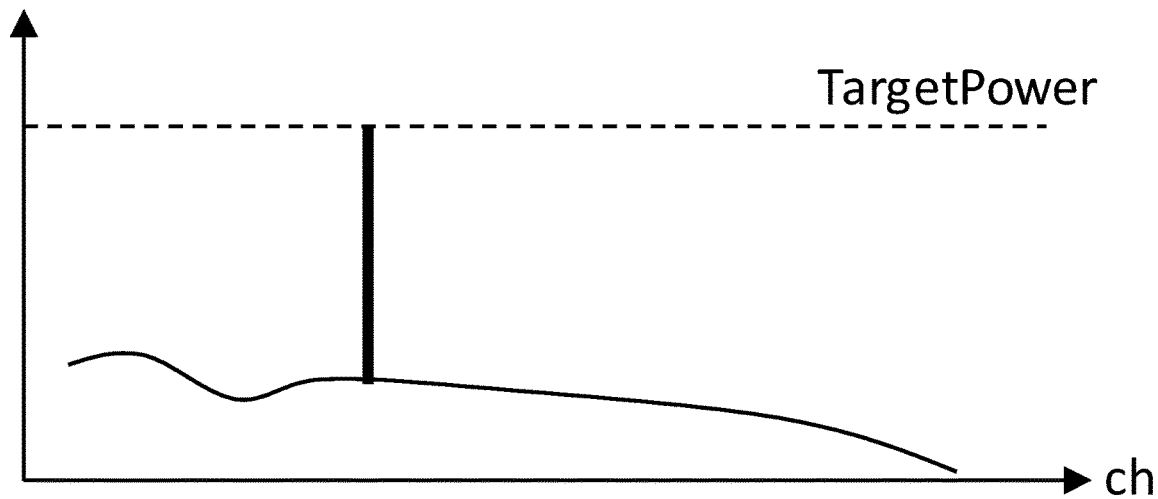
FIGS. 2A and 2B are schematic diagrams illustrating before and after power distribution graphs showing how Spectral Hole Burning (SHB) affects an existing photonic service due to a capacity change.
Figure 2B:
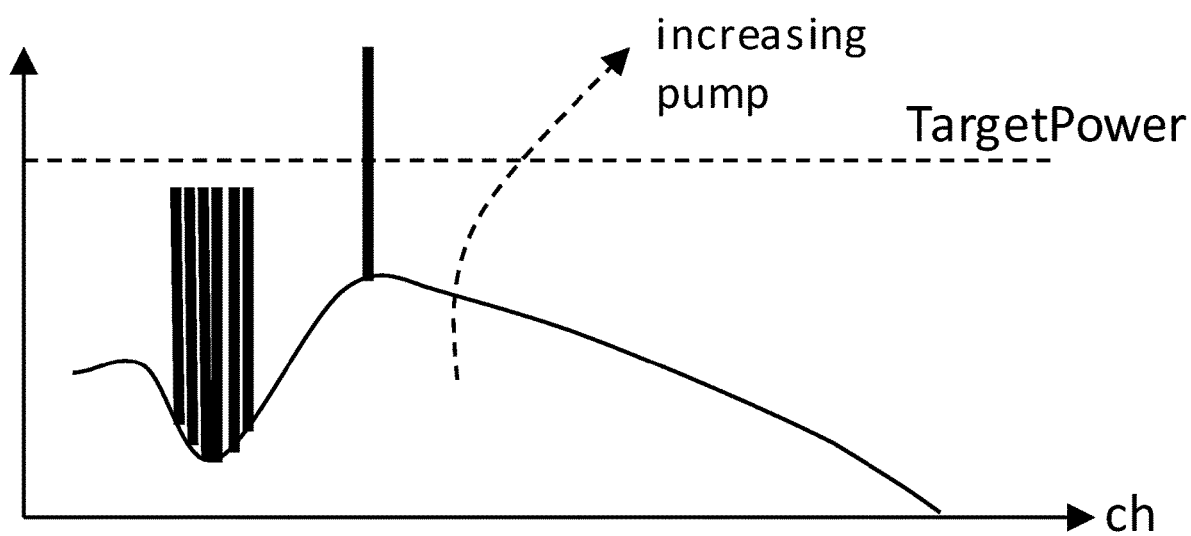
Figure 3A:
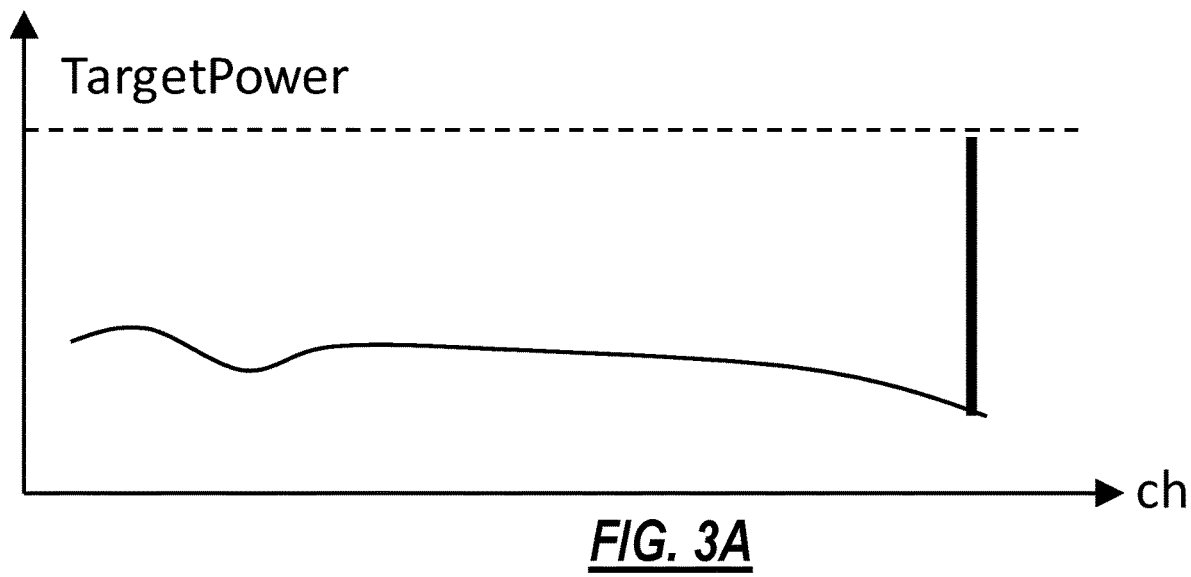
FIGS. 3A and 3B are schematic diagrams illustrating before and after power distribution graphs showing how Spectral Hole Burning (SHB) affects another existing photonic service due to a capacity change.
Figure 3B:
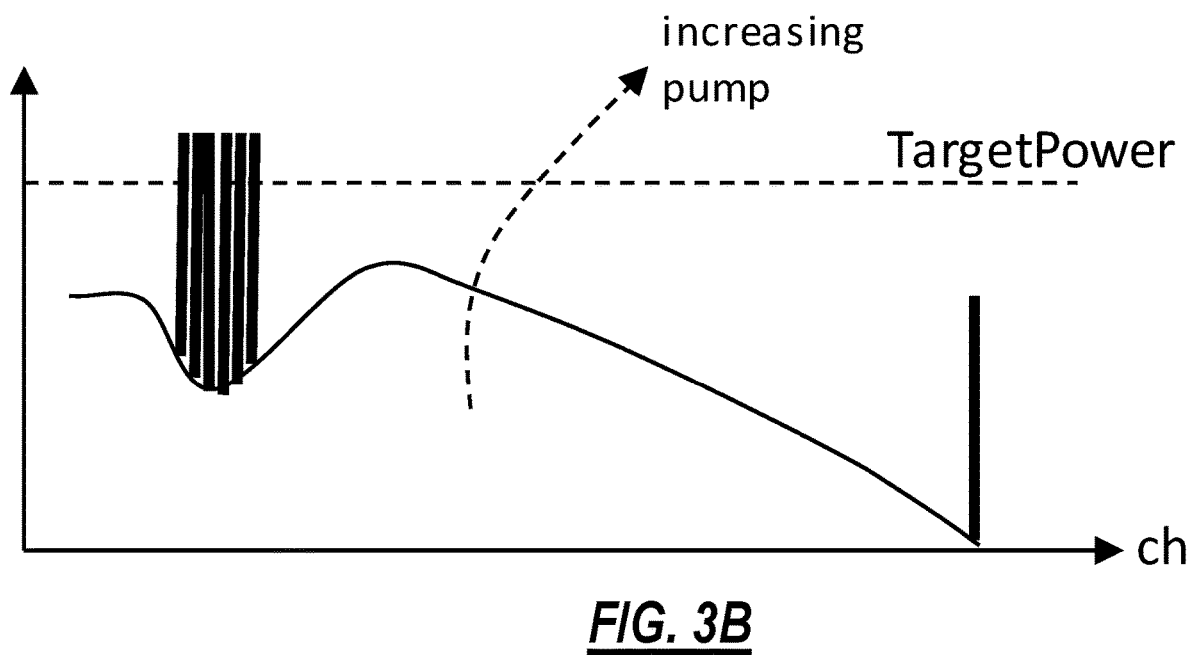
Figure 4:
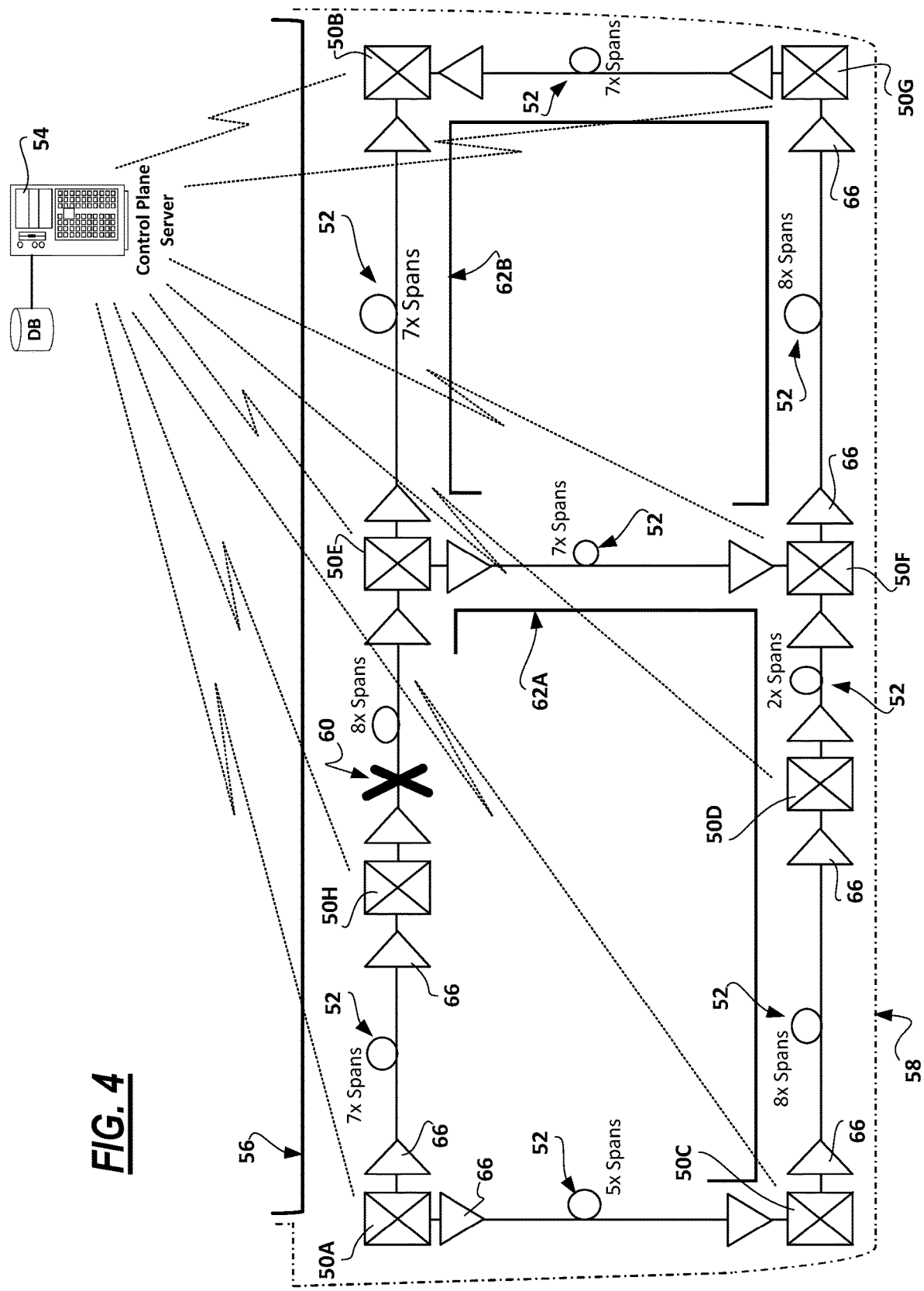
FIG. 4 is schematic diagram illustrating a simplified optical network deployment to illustrate the proposed solution.
Figure 5:
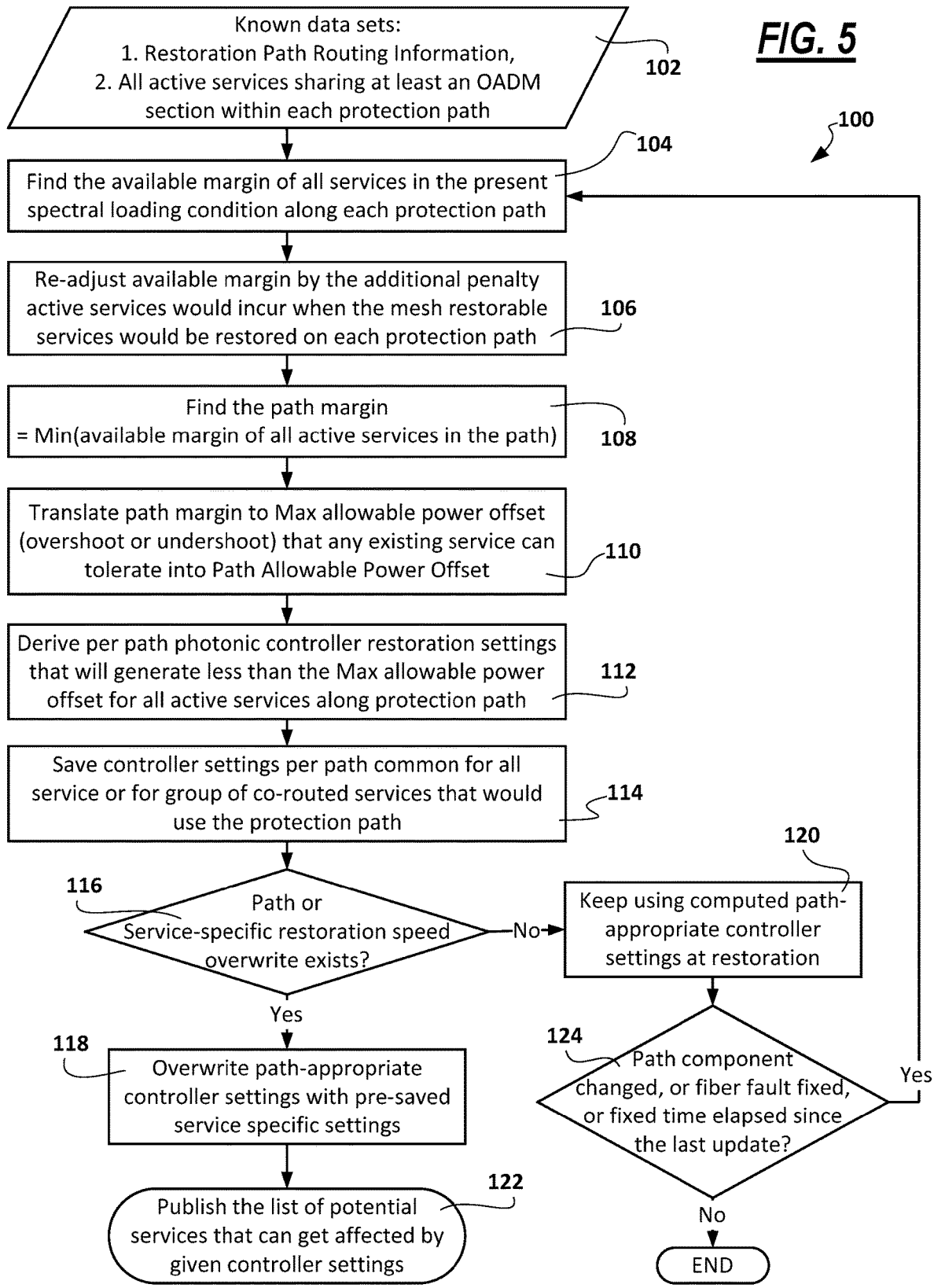
FIG. 5 is a schematic flow diagram illustrating a process in accordance with an embodiment of the proposed solution.

FIG. 5 schematically illustrates a process flow in accordance with an embodiment of the proposed solution. Such a process 100 for pre-programming Layer-0 restoration speed starts at 102 with at least each OADM node 50 in the optical network knowing the (in-service) restorable services originating on that node 50, preferably the control plane (server 54) is also knowledgeable of restorable services provisioned in the optical network. The control plane (server 54) is also knowledgeable of the possible protection optical paths (not-in-service) for each restorable service, for example protection path 58 for in-service photonic service 56 between the originating 50A and the destination node 50B pair. It is understood that this knowledge can be provided by other path provisioning processes, for example performed by the control plane server 54 or other path provisioning network controller(s). In some implementations such optical path knowledge is tracked for example in a (local/distributed/central) service provisioning database.

With each protection path being considered by default viable for the corresponding restorable service, for each protection path 58 process 100 finds all other active services (56) in the optical network which are currently either sharing the same path or using at least one optical section (from one OADM 50 to the next OADM 50, where the spectral loading on the fiber 52 remains constant) along the path 58.

For each active service in each protection path, process 100 estimates, at 104, available margin. The margin parameter can for example be defined for a service in terms of a difference (delta) between the accumulated Optical Signal to Noise Ratio (OSNR) in the path and the minimum OSNR required for any receiver (Rx) to successfully lock onto the signal of interest to run error free operation. As another example, the available margin can also be defined for a service in Signal-to-Noise Ratio (SNR) format as well, where SNR includes the impact of OSNR and the impact of propagation in the transmission fiber including nonlinear cross-talk. The SNR and OSNR also have a scaling factor which is defined by the Baud rate and the effective bandwidth of the optical signal. At 104, the margin for a service can be calculated in multiple ways for a photonic service using data measured from systems and transponder. The OSNR available margin for an existing photonic service can be estimated, for example, without limiting the invention thereto based on performance metrics including but not limited to: Pre-FEC (Forward Error Correction) BER (bit error rate), dBQ (Q-factor on a dB scale) measured from the transponder, etc., and based on measured and/or estimated OSNR of the photonic service after traversing through the path. For example, in accordance with a specific implementation of the proposed solution, an analytic formula for relating BER to Signal-to-Noise Ratio (SNR) for Dual Polarization Quadrature Phase Shift Keying (DP-QPSK) signal can be presented as:

$$Q = \sqrt{2} * erfc^{-1}(2 * BER)$$
$$SNR_{dB} = 10 * \text{Log}_{10}(Q^2)$$

For custom modulation formats, lookup tables can be employed to convert the measured Q-factor or BER into an SNR value. Once the current operating SNR is determined, the SNR margin can be obtained by taking the delta with the minimum SNR required to ensure the FEC will still be able to provide error free operation.

Figure 6A:
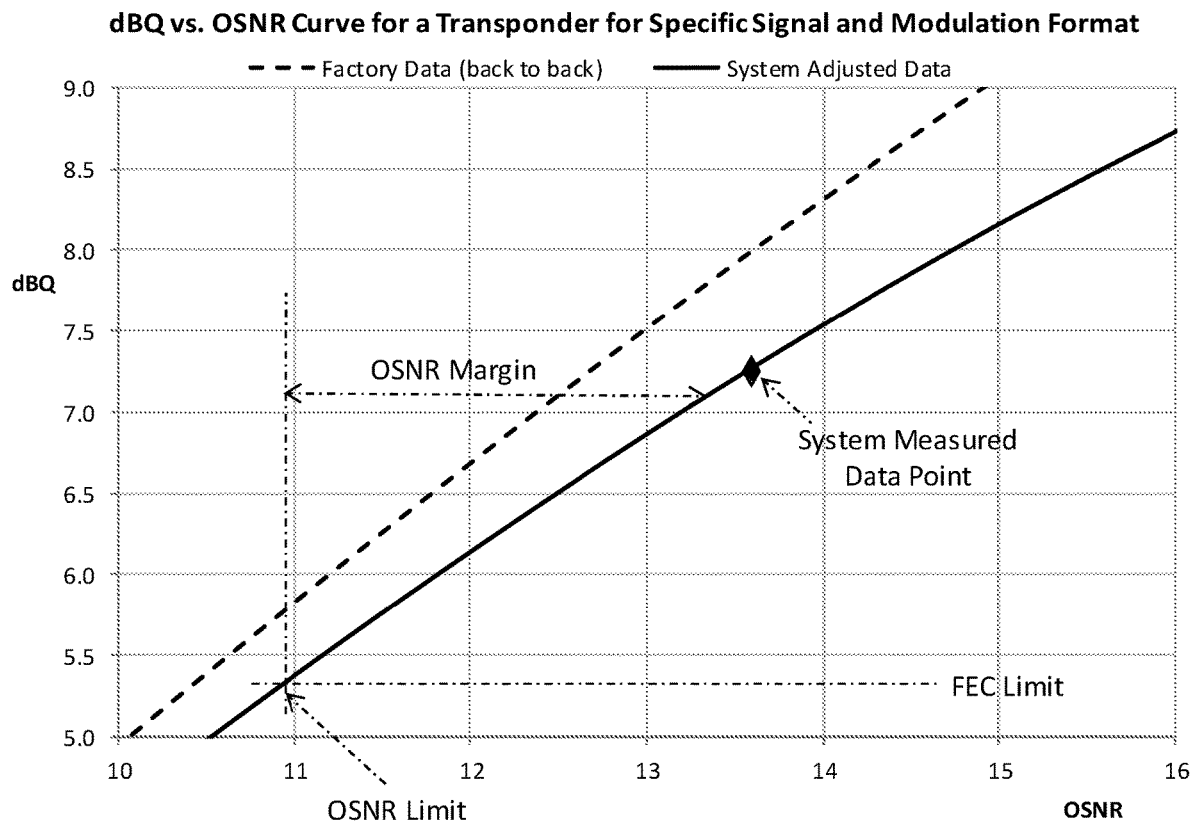
FIGS. 6A and 6B are schematic diagrams graphically illustrating examples of margins for photonic services in accordance with various embodiments of the proposed solution.

In accordance with an implementation of the proposed solution, another method for estimating margin is to use a Q vs. OSNR curve is illustrated in FIG. 6A. Such a Q vs. OSNR curve can be obtained for each service specific line facing transponder while calibrated in factory, which can be further adjusted by adding other non-linear impacts and filter penalties in each corresponding path such that the measured data point from the system lies on an adjusted the System Curve (denoted as System-Adjusted data in the graph). The minimum OSNR for the transponder is represented on the graph in FIG. 6A by OSNR limit data point on the System Adjusted curve.

In some implementations the factory calibration data can be provided via a table lookup, while in other implementations the factory calibration data can include a functional dependency characterized by a small number of parameters. In preferred implementations, the system-adjusted data is computed on the fly based on optical path specifications and then currently obtained optical network data. In some implementations computation of the system adjusted data can be performed at the centralized control plane server 54 having complete information regarding service provisioning in the optical network, however in preferred implementations the system adjusted data can be computed at distributed "in-skin" control plane (intermediary controllers) having sufficiently complete visibility with respect to the original in-service optical path and/or its corresponding protection path providing restoration.

Considering that in general multiple protection paths can share optical sections, knowing the per-service available margin helps to derive the path margin. Once the available margins for each active service are known, the values are further adjusted, at 106, by considering additional penalties each photonic services will incur when the new set of restorable services will be restored and optimized on each corresponding protection path. One possible approach to readjust the available margins can include taking into consideration exactly where in the spectral locations and at which power level, the new set of channels will be restored (and/or provisioned) and performing a full mathematical modeling and simulation of the physical line system to quantify the impact on the SNR margin of the existing channels due to change in spectral loading conditions on the amplifiers and due to impact of SRS, amplifier gain ripple and tilt effects. Another possible approach can include modeling through phenomenological means wherein measured margin feedback from the (optical transport) system which undergoes changes in spectral loading on an ongoing basis is used in a machine learning algorithm or to train a neural network or the like. Such an algorithm, once sufficiently trained on an optical network, can be employed to determine the impact on the SNR margin of existing channels due to changes in spectral loading conditions in the optical network.

Once the re-adjusted margin is known for all existing in-service channels, a Path Margin is then calculated, at 108, for example by taking the minimum of the adjusted-margins of all active services on that protection path. The Path Margin value is then translated, at 110, to a maximum allowable power offset (in terms of overshoot or undershoot) that the existing active service with the minimum margin on that protection path can tolerate, or most conservatively in any other path if multiple protection paths are possible. In accordance with some implementations the translation includes a table lookup, while in accordance with other implementations a predictive linear approximation is employed. In accordance with a preferred embodiment of the proposed solution real time physical modeling is employed (for example as described hereinbelow).

Figure 6B:
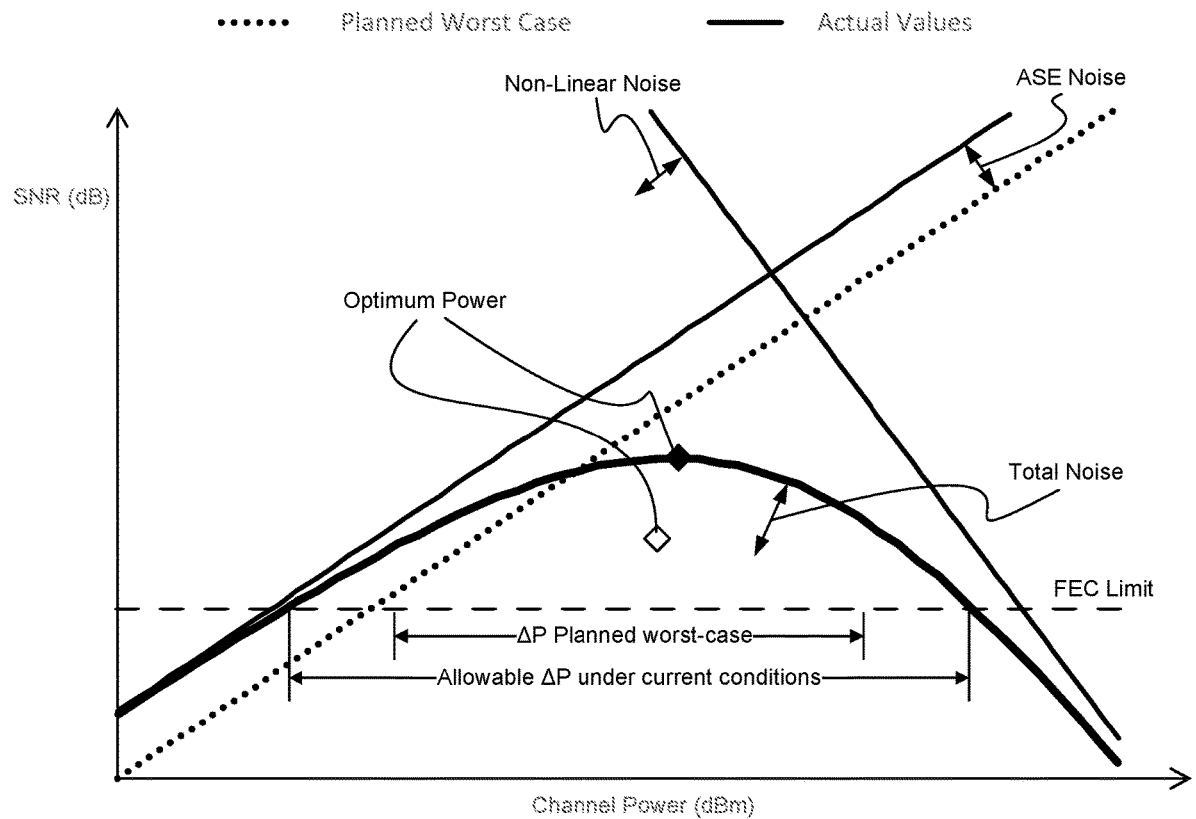

In accordance with the proposed solution, the implementation illustrated in FIG. 6A can be enhanced by considering a SNR margin vs. per channel power perturbation model for example as illustrated in FIG. 6B.

FIG. 6B describes the SNR margin for a channel initially going up with an increase in channel launch power into the fiber, and at some point, when the non-linear noise component becomes too high, the SNR margin starts to drop. The graph illustrates a power vs. SNR curve based on the worst case planned data points, and a similar adjusted curve based on the current system measured conditions. The planned data can be obtained based on factory calibrated data points for the specific transmitter/receiver (Tx/Rx) type, its Baud rate, line rate and modulation format, using mathematical modeling of the physical line system. For the current system measured conditions, the curve can be obtained using measured SNR margin (based on BER or Q) and current launch power into the fiber, based on measured ASE noise and presently estimated non-linear noise penalty components. For either curve, there is a FEC limit for SNR margin beyond which, the receiver fails to acquire error free traffic detection. For both the worst-case margin conditions and the present network conditions, the graph enables obtaining the perturbation room for channel launch power, which is then translated into an allowable power offset for each channel from its optimum launch power target. As described earlier, the allowable power offset for a channel with minimum SNR margin in a path defines the allowable power perturbation (also known as Path Allowable Power Offset) for any fiber span within that path.

The result is referred to as the Path Allowable Power Offset, which is then used, at 112, to derive photonic controller settings per OADM sections along the protection path to ensure that the photonic controller settings will generate less than the maximum allowable power offset for active services along the protection path.

For example, in terms of photonic controller settings per OADM section along the protection path, such photonic controller settings include, but are not limited to, slew rate, response time (also known as controller convergence time to achieve a given target), delta time between two consecutive controller cycles, and controller coefficients such as Proportional-Integral-Derivative (PID) coefficients for photonic controllers responsible for controlling per channel actuators as well settings for optimizing the spectrum in an optical line system. A set of (optical section) controller settings can be pre-defined based on actual network testing or simulations for which, if enabled for restoring channels on protection paths, the end-to-end convergence time to restore those channels on a protection path, and the maximum power offset the particular controller setting can generate on existing active services are known. Offline simulations or testing can ensure that particular controller settings also provide a stable response within the optical network.

In accordance with one embodiment of the proposed solution, one approach can be based on Path Allowable Power Offset: the method automatically looks up the available pre-defined controller settings and selects a setting that provides a power offset for existing active services, setting which is less than or equal to the Path Allowable Power Offset value. With this approach, the method ensures non-service affecting controller settings to restore the restorable services and yet able to advertise the expected restoration time based on controller convergence. This approach is regarded as providing 114 automatic conservative controller settings.

In accordance with another embodiment of the proposed solution, another approach enables an administrator or higher layer controllers to set a desired Layer-0 restoration speed. An input time value is then compared 116 with available controller settings and their convergence time, and a setting is selected which can either meet 118 the desired speed criteria or provides 120 the fastest possible compared to the desired criteria as constrained by physical hardware limitations such as minimum actuator response time and optical power measurement scanning time to get a fresh optical power data to act on. Since the approach in 118 does not select controller settings based on power offset, the selected settings can generate a power offset that is higher than the Path Allowable Power Offset value, and can potentially impact services on the path running with low margin. With this approach 118, the process also (highlights) advertises 122 the potential existing services that could be affected while the restoration will take place on that protection path. Regardless, in some implementations, the administrator or higher layer controller can proceed with this approach if, for example, the affected services are deemed to be lower priority than the given restorable services' desired restoration time. This approach is regarded as providing comparatively risky manual override controller settings.

Irrespective of which approach is used, once the controller settings are selected for a protection path, the setting is then pre-saved for example in static data sets, for each protection path so that any MR-service or group of co-routed services that will use the protection path can use the settings at the time of restoration on that protection path. In preferred implementations, before restoration on to a protection path the control plane applies the selected controller settings per OADM node, where the typical photonic controllers (such as per channel controller and spectrum controllers) reside.

In accordance with preferred embodiments, the control plane settings are selected such that the given set of settings the affected OADM nodes/node controllers/optical section controllers act in unison, preferably in parallel, to provide a unified restoration time regardless of the number of existing services on that protection path or the number of services that will be restored on that protection path.

In accordance with a preferred embodiment of the proposed solution, the available adjusted margins for existing services employed to decide on controller settings are periodically 124 estimated considering then present network conditions before the restoration is triggered so that the expected Layer-0 restoration time is either known or can be programmed ahead of time.

Without limiting the invention, instead of the periodic estimation approach, it is also possible to employ methods for dynamically deciding restoration speed settings around the time of restoration on a specific protection path (for example after the fault 60 is detected and restoration is triggered for restorable services) based on the protection path's present spectral loading conditions and their available adjusted-margins for only restoring services affected by the fault 60. For clarity, while the proposed solution had been described to include proactive computation of controller settings, computing controller setting for all protection paths in the optical network is not required each and every time a fault occurs. However, when a new photonic service is provisioned proactive computation of controller settings for all protection paths in the optical network may be initiated or preferably scheduled.

It is understood that process steps involving table lookups in factory calibration data can be performed closer to, or by, Optical Section Controllers 56 in a distributed fashion for a number of optical paths, while the computation (functional extrapolation, perturbation model computation, etc.) can be performed by control components closer to, or in a centralized fashion by the control plane server 54, before and/or just prior to service restoration over the protection path. Employing the combination of table lookups, functional extrapolations and perturbation model computations enables a faster, preferably time parallel, convergence time without impacting existing in-service optical paths.

In Use

Figure 7A:
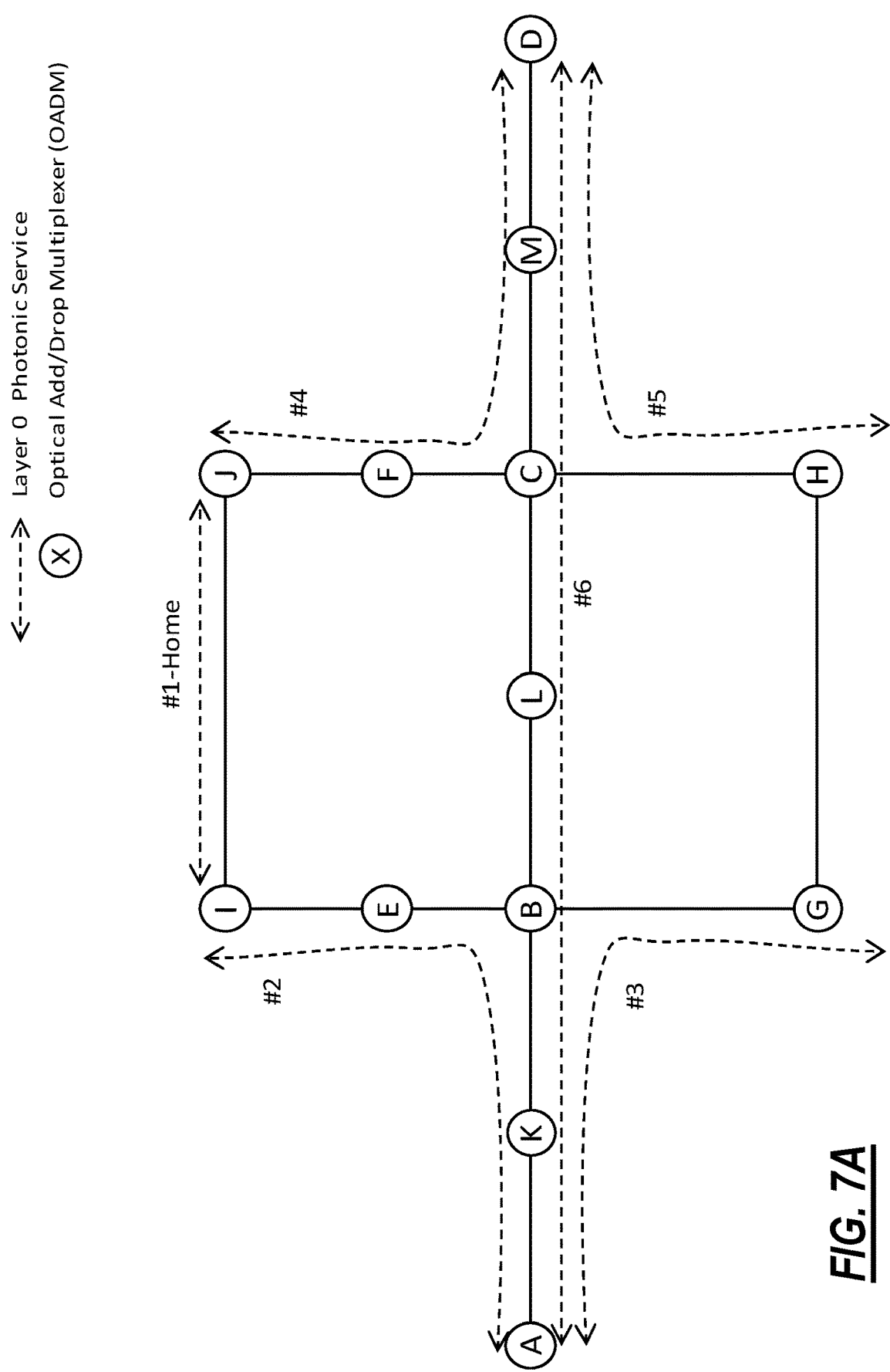
FIG. 7A is a schematic mesh network diagram illustrating an example of photonic services provisioned in a mesh network.
Figure 7B:
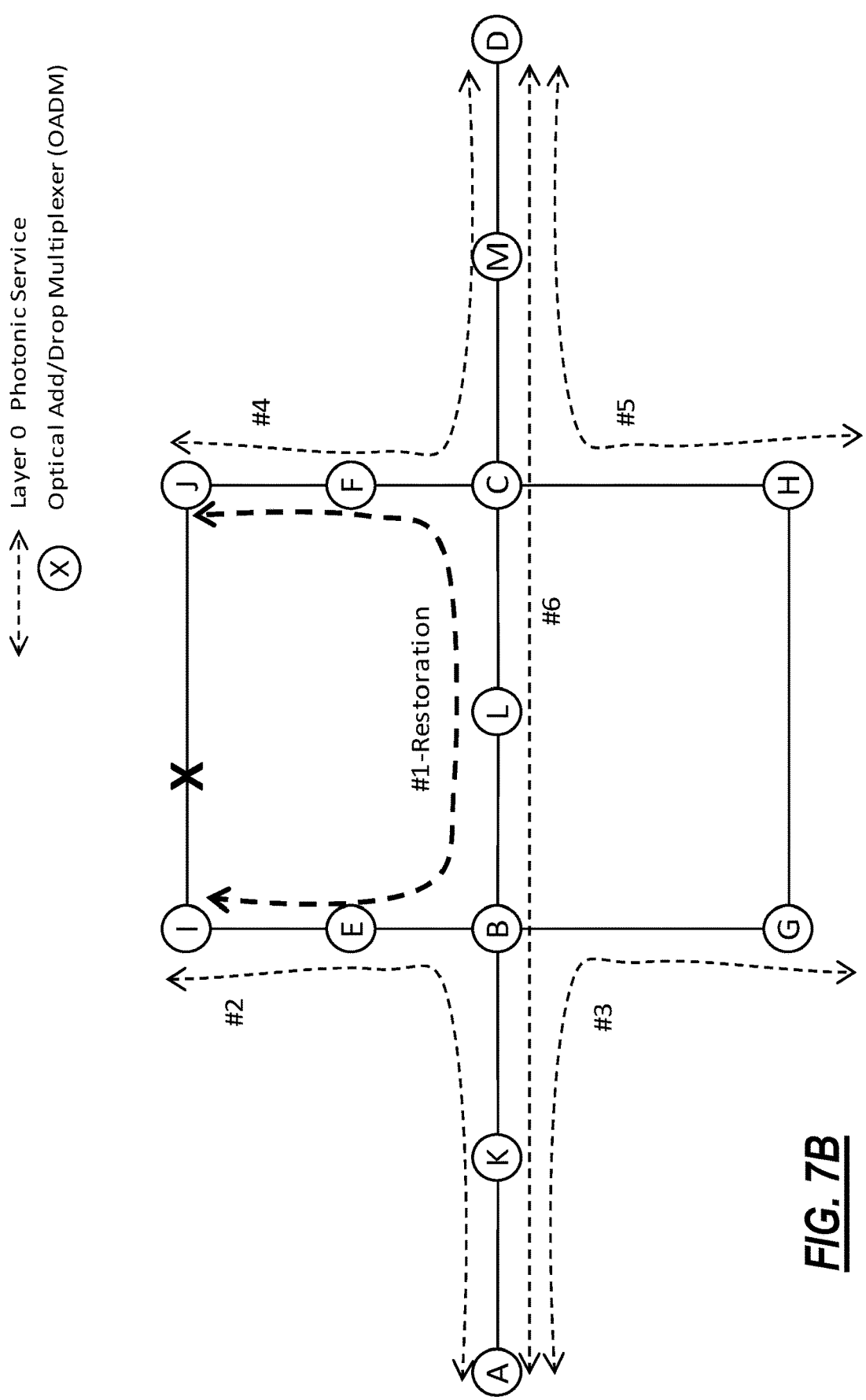
FIGS. 7B and 7C are schematic mesh network diagrams illustrating various use scenarios of methods and systems in accordance with various embodiments of the proposed solution.
Figure 7C:
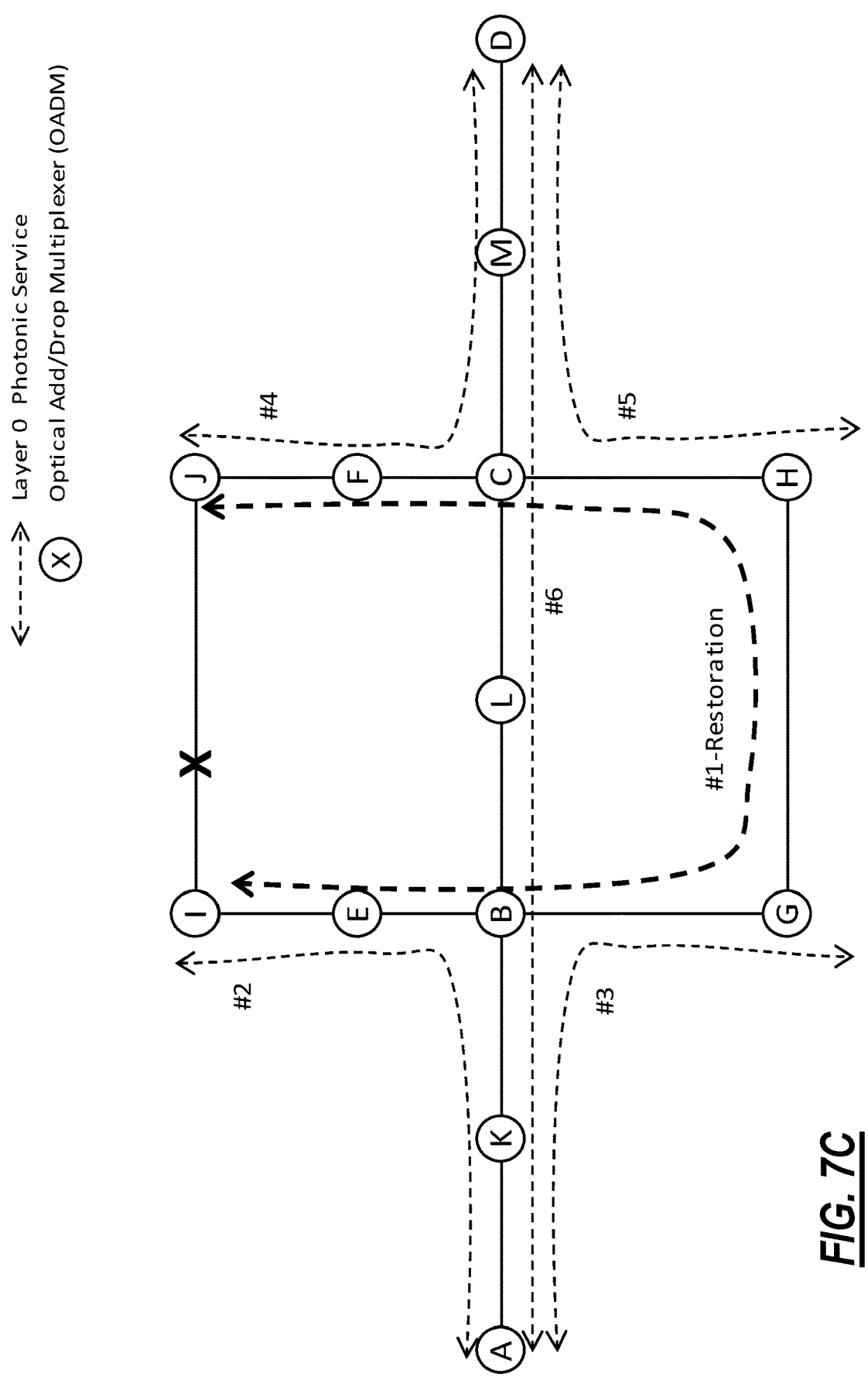

FIGS. 7A, 7B and 7C illustrate schematic mesh network views of a network restoration example employing the proposed solution.

To further illustrate the proposed method, an optical mesh network example is shown in FIG. 7A, where restoration speed is pre-programmed for a mesh-restorable photonic service #1 currently provisioned on its home path I-J. In accordance with this example, photonic service #1 has two viable restoration paths in the mesh network should a fault occur on its home path: protection Path_1 option I-E-B-L-C-F-J is schematically illustrated in FIG. 7B, and protection Path_2 option I-E-B-G-H-C-F-J is schematically illustrated in FIG. 7C.

Figure 8A:
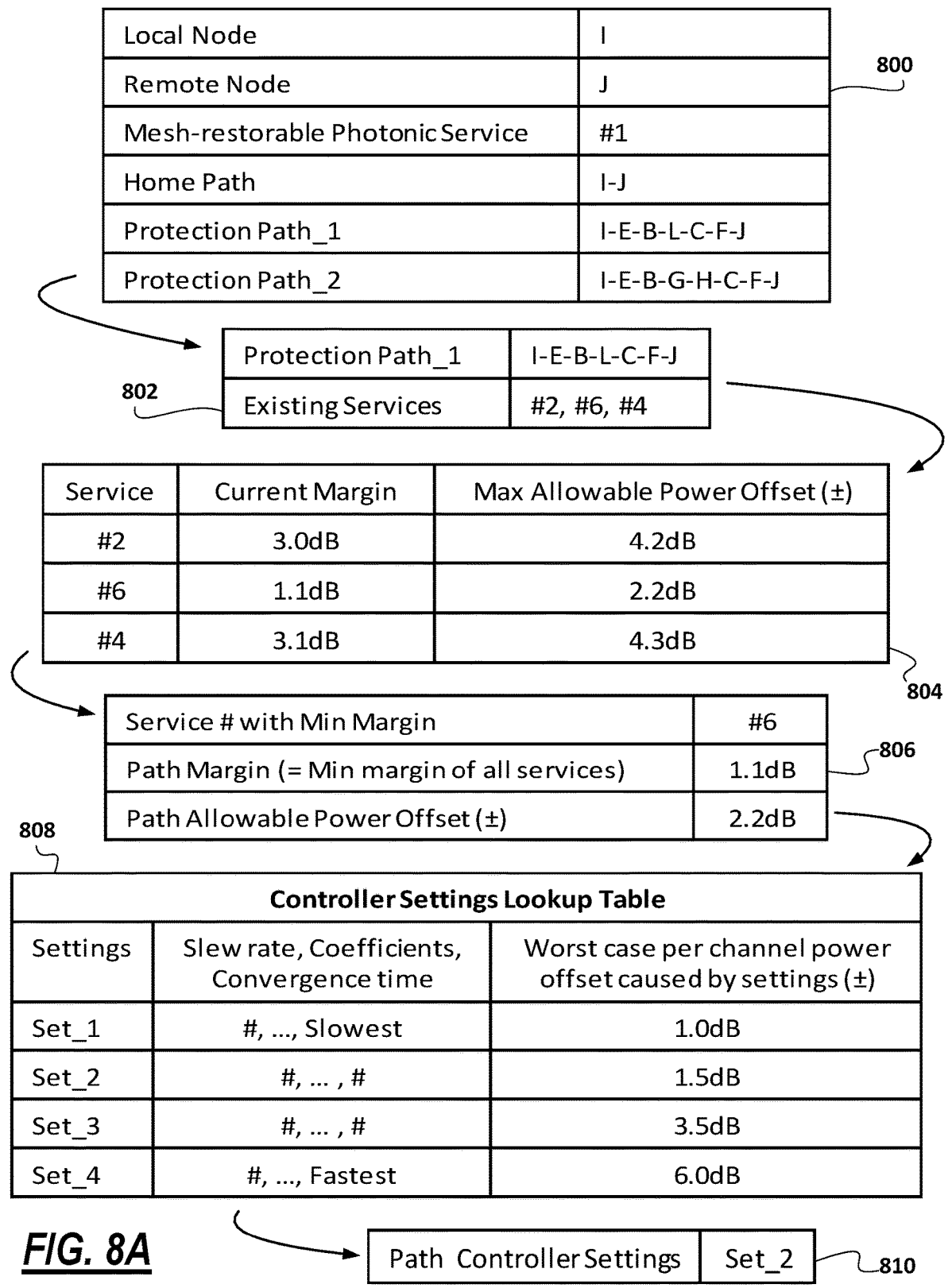
FIGS. 8A and 8B are schematic diagrams illustrating data sets employed by methods and systems in accordance with some implementations of the proposed solution.

In considering finding the appropriate controller settings and hence, the restoration speed for protection Path_1, option illustrated in FIG. 7B, with reference to FIG. 8A, the process starts with obtaining the provisioned service #1 information for example as illustrated in table 800. Selecting protection Path_1, table 802 illustrates three provisioned active services #2, #6 and #4, and partially sharing at least one optical section along protection Path_1. Next, as presented in table 804, the current available margin for each of these provisioned services are estimated, and then the margin value is further re-adjusted considering the penalty that would take place if MR service #1 and other possible mesh-restorable services are restored onto protection Path_1 for the same fiber fault event. Out of these existing services and their available re-adjusted margins, the Path Margin and Path Allowable Power Offset value are calculated. The re-adjusted margins, and the maximum power offset each service can tolerate is highlighted in table, for example as presented at 806. In accordance with the illustrated example service #6 plays the deciding factor which is then used to check in a controller settings lookup table 808 to select a set of controller settings which will provide a power offset less than the Path Allowable Power Offset value. The controller settings for protection Path_1 is then pre-saved 810 so that the control plane can apply those photonic controller settings applicable to all per channel photonic controllers/actuators in the protection path right before restoring (or adding a capacity for the first time) any photonic service or group of co-routed services on that path. Pre-saving such controller settings against a service path object is illustrated in FIG. 9A.

Figure 8B:
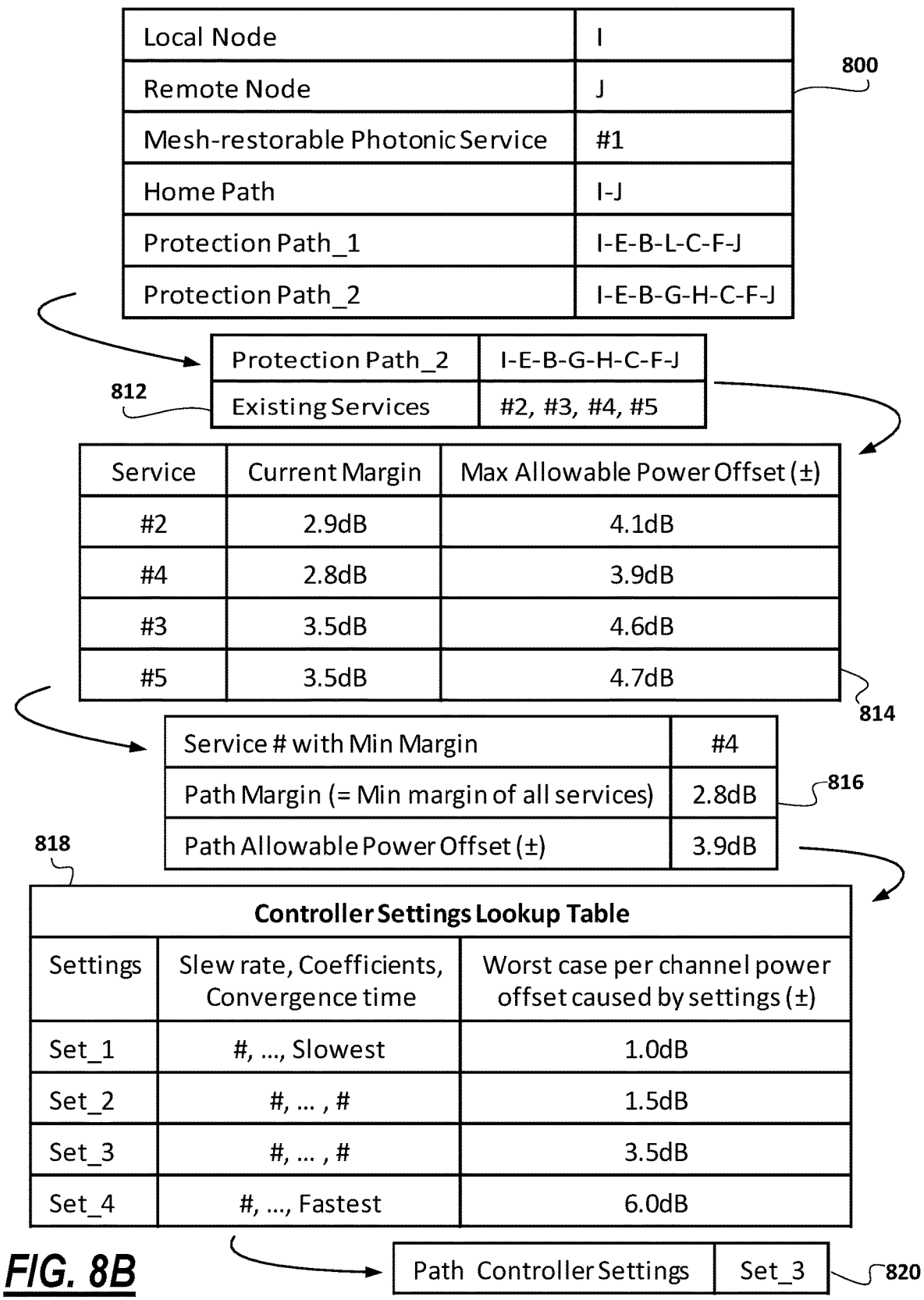

With reference to FIG. 8B, the proposed algorithm follows a similar approach for protection Path_2 (812) illustrated in FIG. 7C, where the algorithm finds a different service #4 at 814, 816 as the decider for Path Margin and Path Allowable Power Offset values and saves 820 the appropriate controller settings accordingly. The key point is, controller settings are determined 818 and saved FIG. 9A per protection path and not specific to an optical section. For example, the controllers in optical sections I-E, E-B, C-F, F-J will follow controller setting set_2 if services are restored using protection Path_1, while the same controllers will follow different controller setting (e.g. set_3) if protection Path_2 is used for restoration.

While each protection path is pre-calculated for a set of controller settings to provide a path-appropriate non-service affecting restoration speed, the method also allows a service specific restoration speed over-write capability, where the desired speed for a service can be pre-saved ahead of time regardless of the restoration path it takes or the existing services it may interrupt during the event of restoration, see FIG. 5. An example of such service specific over-write settings is highlighted in Table of FIG. 9B, where for a high priority mesh-restorable service (in this example, service #1), the fastest possible convergence time or restoration speed is desired, which will allow control plane to select a controller setting capable of providing the fastest end to end convergence at the time of restoration regardless of the restoration path it takes.

For certainty, while the invention has been described with respect to path restoration, it is understood that path restoration is the most stringent action requiring most stringent operation. The process above is understood to be employed in conjunction (either in sequence or in parallel) with deleting the photonic service on optical sections upstream or downstream of the failed link along the home service path #1. The process such as, but not limited to the process described above, is employed to provide settings to optical section controllers, settings which would ensure that existing active services provisioned via operational optical sections are not impacted by the photonic service delete. For example, delete actions on optical sections upstream of the fiber fault 60 and delete actions on optical sections downstream of the fiber fault 60 (not shown) can be performed concurrently providing an improved teardown speed.

Advantages of the proposed solution can be derived also when employed in new photonic service provisioning actions wherein existing active services along a proposed provisioning path must not be affected by the addition of a new photonic service. Once the provisioning path for a new photonic service is determined by the control plane, the process as described with respect to protection path examples presented in FIGS. 7B, 7C, 8A and 8B is followed where the protection path is replaced by provisioning path. In accordance with such implementation, the provisioning path providing fastest provisioning time can be selected over the other.

Higher layer routers and switches can be made aware of the expected Layer-0 restoration time, and their switch time can be programmed accordingly. In this way, per section photonic controllers, that have channels traversing all over the network with very much diversified topologies, can be set based on an end-to-end view of the per channel operating signal to noise ratio (SNR) margin or the total accumulated power fluctuations or steady-state power offset each individual channel can tolerate.

Controller

Figure 10:
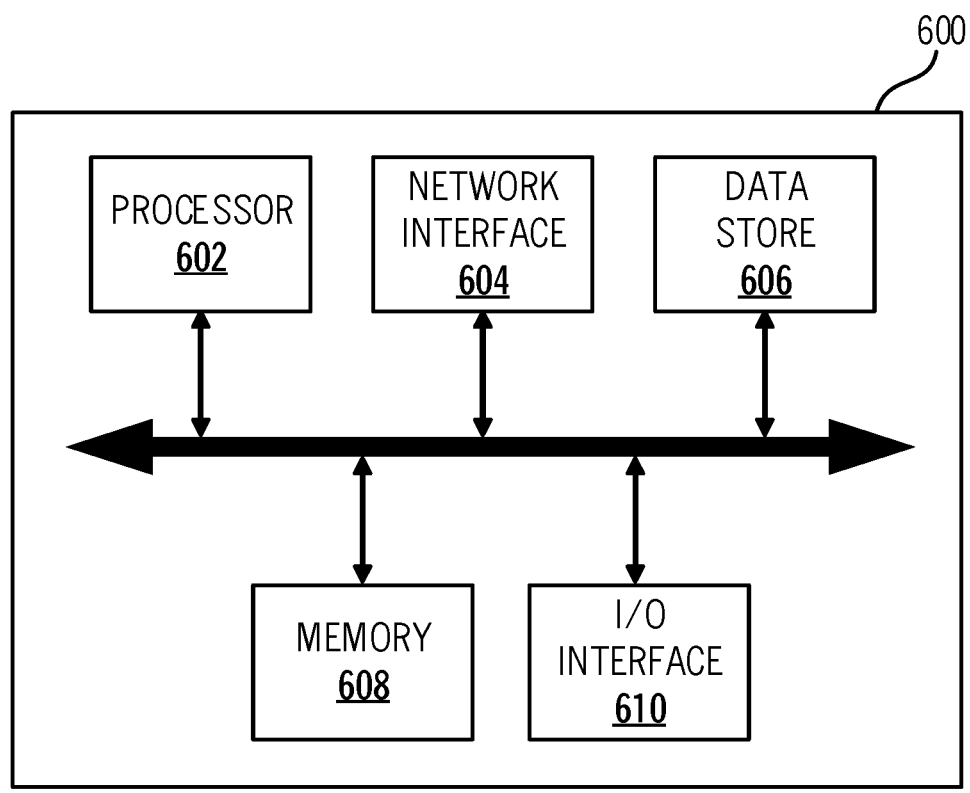
FIG. 10 is a schematic diagram illustrating a block diagram of an implementation of a controller.

Referring to FIG. 10, a block diagram illustrates an example of an implementation of a controller 600. For example, the controller 600 can include the sectional controller (not shown), the control plane server 54 or any other intermediary control plane controller. The controller 600 can be a digital processing device that, in terms of hardware architecture, generally includes a processor 602, input/output (I/O) interfaces 604, a network interface 606, a data store 608, and memory 610. It should be appreciated by those of ordinary skill in the art that FIG. 10 depicts the controller 600 in an oversimplified manner, and a practical embodiment may include additional components and suitably configured processing logic to support known or conventional operating features that are not described in detail herein. The components (602, 604, 606, 608, and 610) are communicatively coupled via a local interface 612. The local interface 612 can be, for example but not limited to, one or more buses or other wired or wireless connections, as is known in the art. The local interface 612 can have additional elements, which are omitted for simplicity, such as controllers, buffers (caches), drivers, repeaters, and receivers, among many others, to enable communications. Further, the local interface 612 can include address, control, and/or data connections to enable appropriate communications among the aforementioned components.

The processor 602 is a hardware device for executing software instructions. The processor 602 can be any custom made or commercially available processor, a central processing unit (CPU), an auxiliary processor among several processors associated with the controller 600, a semiconductor-based microprocessor (in the form of a microchip or chip set), or generally any device for executing software instructions. When the controller 600 is in operation, the processor 602 is configured to execute software stored within the memory 610, to communicate data to and from the memory 610, and to generally control operations of the controller 600 pursuant to the software instructions. The I/O interfaces 604 can be used to receive user input from and/or for providing system output to one or more devices or components. For example, if the controller 600 is included in a network element, the I/O interfaces 604 can include backplane connections or the like to communicate with other components in the network element. The network interface 606 can be used to enable the controller 600 to communicate on a network. For example, the I/O interfaces 604 and/or the network interface 606 can communicatively couple the controller 600 to a WSS in an OADM node 50, the amplifiers 66, an OPM, etc.

The data store 608 can be used to store data. The data store 608 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 608 can incorporate electronic, magnetic, optical, and/or other types of storage media. The memory 610 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 610 can incorporate electronic, magnetic, optical, and/or other types of storage media. Note that the memory 610 can have a distributed architecture, where various components are situated remotely from one another, but can be accessed by the processor 602. The software in memory 610 can include one or more software programs, each of which includes an ordered listing of executable instructions for implementing logical functions. The software in the memory 610 includes a suitable operating system (O/S) 614 and one or more programs 616. The operating system 614 essentially controls the execution of other computer programs, such as the one or more programs 616, and provides scheduling, input-output control, file and data management, memory management, and communication control and related services. The one or more programs 616 may be configured to implement the various processes, algorithms, methods, techniques, etc. described herein. For example, the programs 616 can be configured to implement method(s) 100.

Logical Control Seams

Again, in accordance with an embodiment, the proposed solution provides speed enhancements to the restoration speeds and approaches described herein. The systems and methods take advantage of available SNR margin per span to obtain the best possible controller speeds for capacity changes or restoration by considering SNR margin available per span within the path. The SNR margin available per span is important since the margin for all channels in a path are typically not constant due to variable spectral population over the path, as well as, considering the fact that the margin impact by control speeds is not uniform across the path. Allowing variable speed restorations along the path and considering the need for mopping up perturbations that results in overall faster restoration compared to a single speed setting along the path (the conventional approach). In some spans or optical sections, it can be slower to respect available margin constraint, where in some other spans or sections with higher channel population or with higher margin, it will be faster. Note, this logical control seam approach is particularly suited for mesh networks.

The systems and methods break down a path into multiple seams. Options for selecting seams are evaluated based on perturbation size for each control speed and channel sensitivity (minimum margin) within the seam. Between seams, add actions are sequenced and a step to remove accumulated power offsets is applied. The total time is calculated as the time taken for each seam plus the mop up steps in-between seams with the objective to minimize the total restoration time across the entire path. Various approaches for selecting seams can include an exhaustive search, heuristics (e.g., low margin channel overlap), and other optimization techniques (e.g., Integer Linear Programming (ILP)).

Also, the terminology restoration speed used herein is equally applicable for programming speed for capacity changes (channel add/delete) or for reversions on a path.

Conventional Approach

Figure 11A:
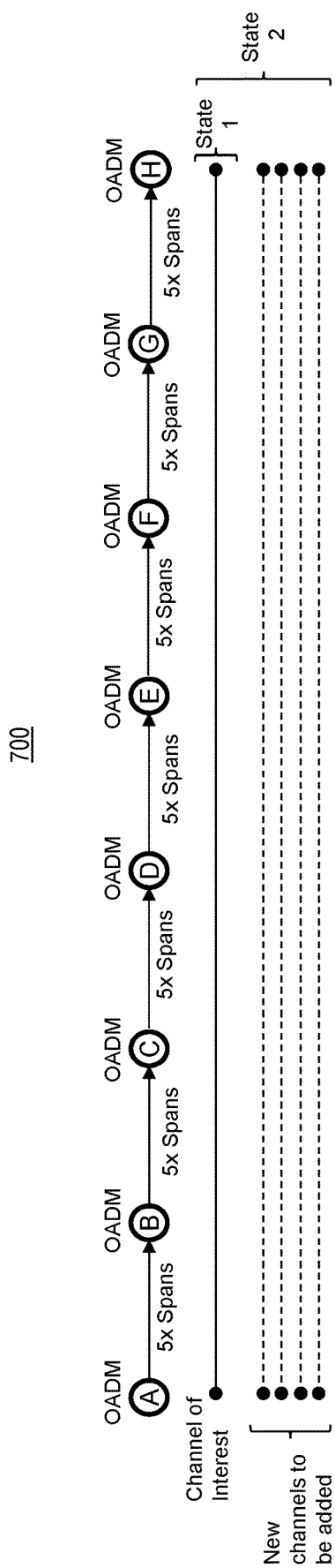
FIGS. 11A and 11B are a diagram illustrating a network with multiple OADMs (labeled A-H) interconnected by multiple spans (e.g., 35 total spans) and a graph of different controller speeds based on required SNR margin versus number of spans.
Figure 11B:
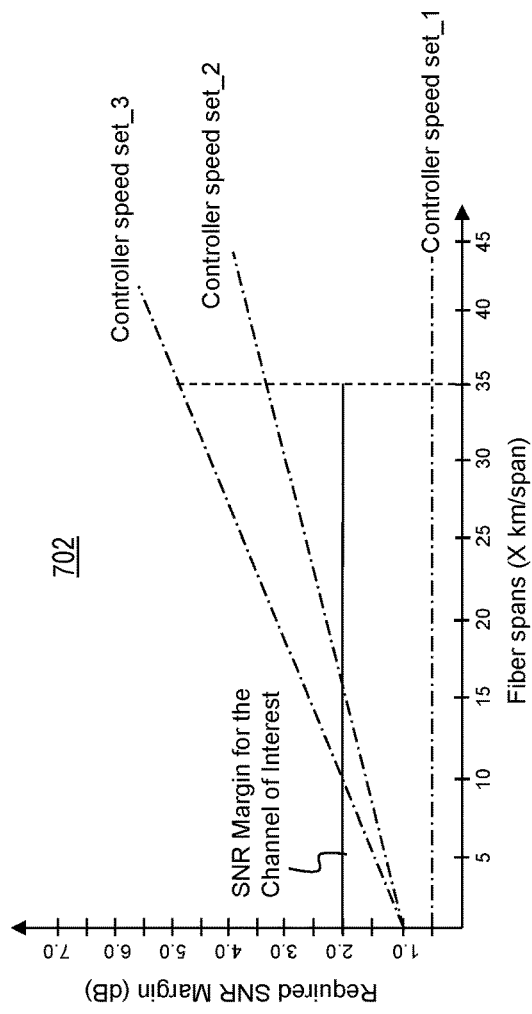

Referring to FIGS. 11A and 11B, a diagram illustrates a network 700 with multiple OADMs (labeled A-H) interconnected by multiple spans (e.g., 35 total spans) and a graph 702 of different controller speeds based on required SNR margin versus number of spans. The network 700 is in "State 1" where only one channel is present over the 35 spans (and 7 OADM sections). In a "State 2," four more channels are added over the same path. For this example, let's consider the channel of Interest defining the minimum margin for a given path (in this case, 35× spans) has 2.0 dB of SNR margin considering the State 1 and State 2 spectral loading conditions. Let's consider, there is an option of choosing 3× controller speed settings for which their typical convergence time and required margin for the given path are highlighted below:

| Controller Speed | Convergence time | Total Channel Add Time for 35xSpans (5x Spans/OADM Section) | Required SNR Margin for 35xSpans |
| --- | --- | --- | --- |
| Set_1 | 20 s/OADM Section | 140 s | 0.5 dB |
| Set_2 | 4 s/OADM Section | 28 s | 3.3 dB |
| Set_3 | 5 s | 5 s | 4.9 dB |

In this case, the available SNR margin for the given path does not allow controllers to select anything other than speed settings "Set_1." The overall convergence time for new capacity changes will be 140 s. That is, even though, the channel had additional margin than the selected controller speed settings, the conventional approach does not account for it.

Determining End-to-End Control Speed

Figure 12:
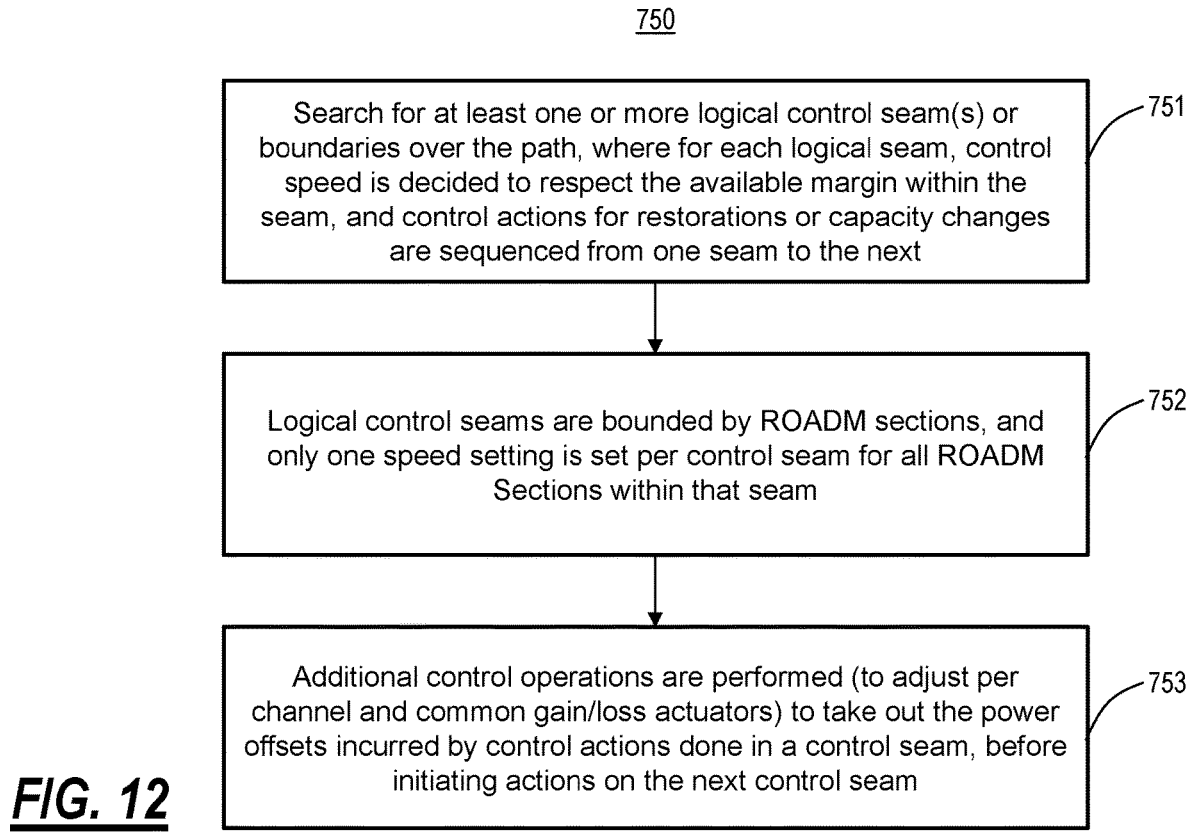
FIG. 12 is a flowchart illustrating a process for determining end-to-end control speed for a path which includes multiples spans and/or multiple OADM sections.

Referring to FIG. 12, a flowchart illustrates a process 750 for determining end-to-end control speed for a path which includes multiples spans and/or multiple OADM sections. The process 750 includes searching for at least one or more logical control seam(s) or boundaries over the path, where for each logical seam, control speed is decided to respect the available margin within the associated seam, and control actions for restorations or capacity changes are sequenced from one seam to the next (step 751), which means the channel add action on a downstream seam does not start until the completion of action on the immediate upstream seam. Note, in FIG. 11A the entire path was one control seam. Here, at least one boundary is determined so the path has at least two logical control seams (i.e., a plurality of logical control seams). The logical control seams are bounded by ROADM sections, and only one speed setting is set per control seam for all ROADM sections within that seam (step 752). Note, the boundary for each logical control seam has to be an OADM section, not a span, but each logical control seam can have different speed settings as appropriate based on the available margin. Additional control operations are performed (to adjust per channel and common gain/loss actuators) to take out the power offsets incurred by control actions done in each logical control seam, before initiating actions on the next control seam (step 753).

The total add time for a capacity change action is provided by the total actions time from different control seams at different control speed settings, plus the total overhead time required to run re-optimization between actions of two consecutive control seams. In other words, a logical control seam defines the maximum number of fiber spans in a path that can tolerate perturbations from a given control speed for channel additions or restorations without causing a traffic hit for existing services in that seam.

Figure 13:
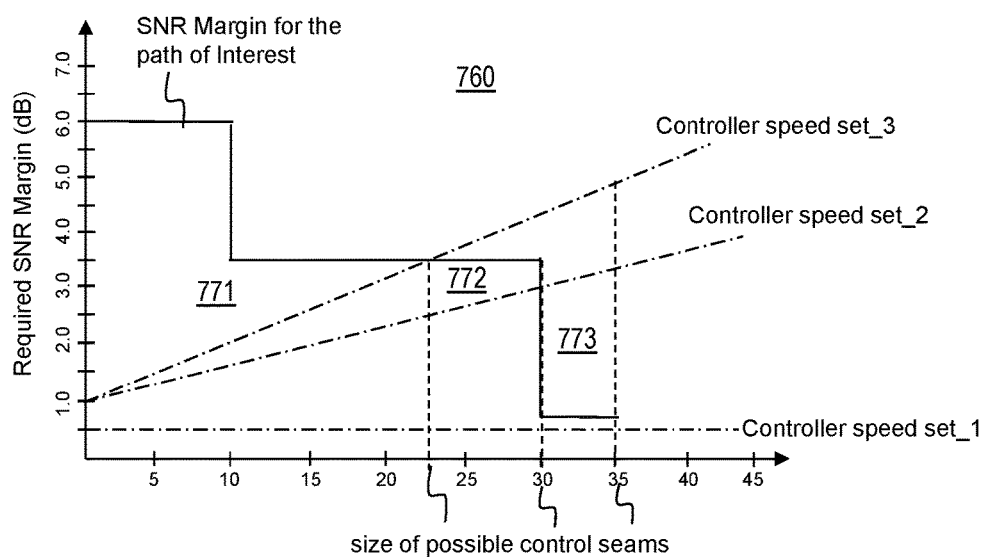
FIG. 13 is a graph illustrating the graph from FIG. 11B plus an overlay line illustrating SNR margin for the path of interest.

Referring to FIG. 13, a graph 760 illustrates the graph 702 plus an overlay line 762 illustrating SNR margin for the path of interest. Again, the graph 760 includes different controller speeds based on required SNR margin versus number of spans. In this example, there are three controller speeds— controller speed set_1>controller speed set_2>controller speed set_3. Thus, controller speed set_3 is the fastest, but requires the most margin. The intersection between SNR margin requirement curve (line 762) over fiber distance (or number of spans or amplifiers) per control speed and the path SNR margin curve gives the max number of spans that can tolerate the given control speed, and hence the size of a control seam. Here, the first span to approximately the $22^{nd}$ span has enough margin for the controller speed set_3–logical control seam 771. The $22^{nd}$ span to the $30^{th}$ span has enough margin for the controller speed set_2–logical control seam 772. Finally, the $30^{th}$ span to the $35^{th}$ span has enough margin for the controller speed set_1–logical control seam 773. Here, there are three logical control seams 771, 772, 773 possible allowing for variable control speeds.

Note, there is the total overhead time required to run re-optimization between actions of two consecutive control seams which means it may not be optimal to have too many logical control seams. That is, it may not be optimal to have logical control seams that cover all controller speeds—speed set_1, speed set_2, and speed set_3. In some embodiments, the increased speed from using the controller speed set_3 may not have an advantage due to the total overhead time and thus it is better to have a bigger seam at the speed set_2.

Examples of Logical Control Seams

Figure 14A:
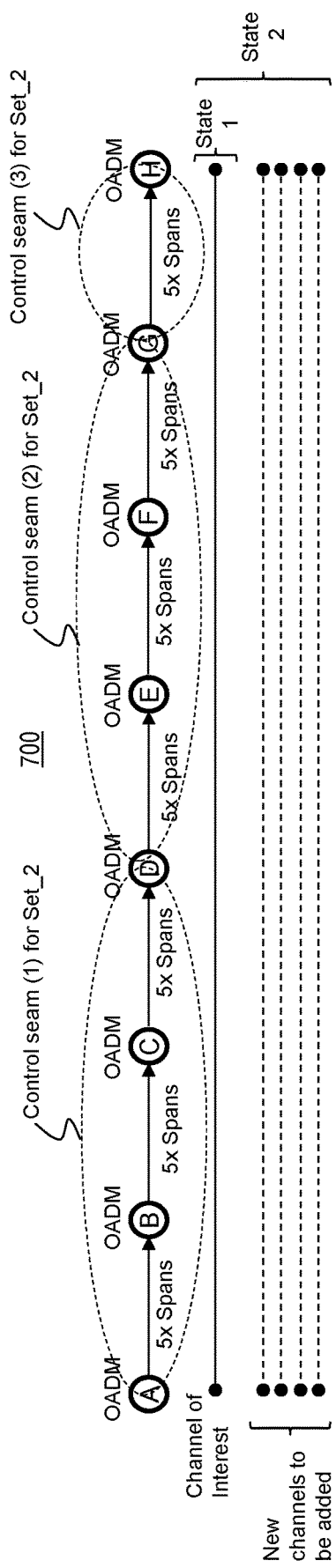
FIGS. 14A and 14B are a diagram illustrating the network with various logical control seams and a graph 780 of different controller speeds based on required SNR margin versus number of spans.
Figure 14B:
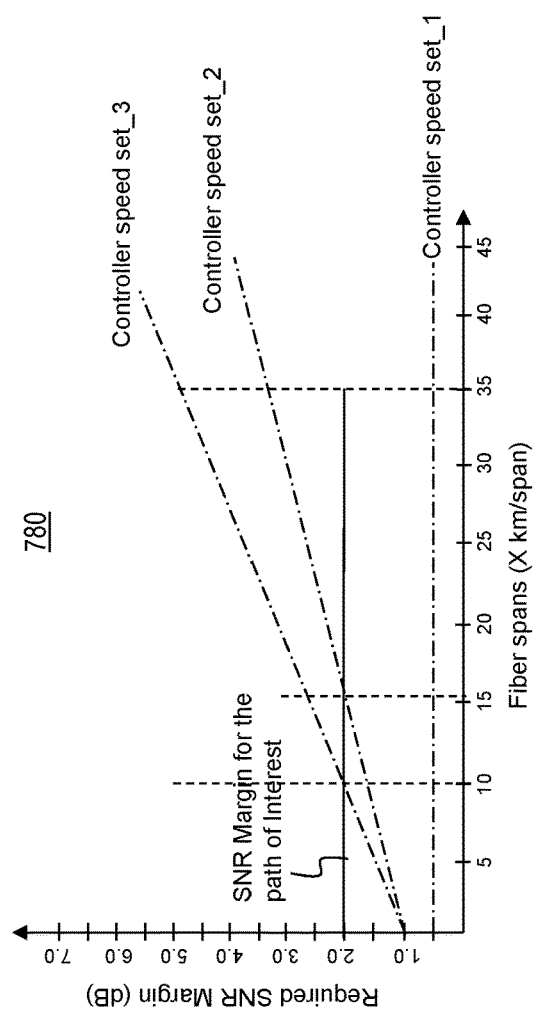

Referring to FIGS. 14A and 14B, a diagram illustrates the network 700 with various logical control seams and a graph 780 of different controller speeds based on required SNR margin versus number of spans. The graph 780 notes the SNR margin for the path is 2 dB over all 35× spans, i.e., the same as in FIGS. 11A and 11B. The process 750 includes dividing the path (which in the network 700 is between OADM A and OADM H) into multiple logical control seams, where each seam is bounded by OADM sections. The division is based on available margin to allow a control speed based on the constraint that control actions between seams are sequenced and only running when power offsets created by control actions in previous seam is minimized. In this example, the available margin on the channel of interest (2.0 dB after 35× spans) does not allow any other controller speed settings other than set_1 across the entire path. Total action time with Set_1=140 s as noted with respect to FIGS. 11A and 11B. However, the channel has enough margin to allow controller speed settings Set_2 up to 15× spans or Set_3 up to 10× spans. Such margin limitation defines the logical control seams over the path. In this case, to achieve a speed settings of Set_2, the end to end path can be divided into 2× logical seams. The achievable capacity change time will be:

Seam (1): 3× sections; 4 s/Section=12 s
Seam (2): 3× sections; 4 s/Section=12 s
Seam (3): 1× section; 4 s/Section=4 s
Estimated overhead to optimize each seam before starting action to next=16 s
Total action time with Set_2=12+16+12+16+4=60 s.

To achieve a speed settings of Set_3, the end to end path can be divided into 4× logical seams. Achievable capacity change time will be:

Seam (1): 2× sections; 5 s irrespective of section count=5 s
Seam (2): 2× sections; 5 s irrespective of section count=5 s
Seam (3): 2× sections; 5 s irrespective of section count=5 s
Seam (4): 1× section; 5 s irrespective of section count=5 s
Estimated overhead to optimize each seam before starting action to next=16 s
Total action time with Set_3=4*5+(4-1)*16=68 s;

With the process 750, it appears controller Speed Set_2 will provide best capacity add time in this example (60 s, compared to 140 s or 68 s).

Figure 15A:
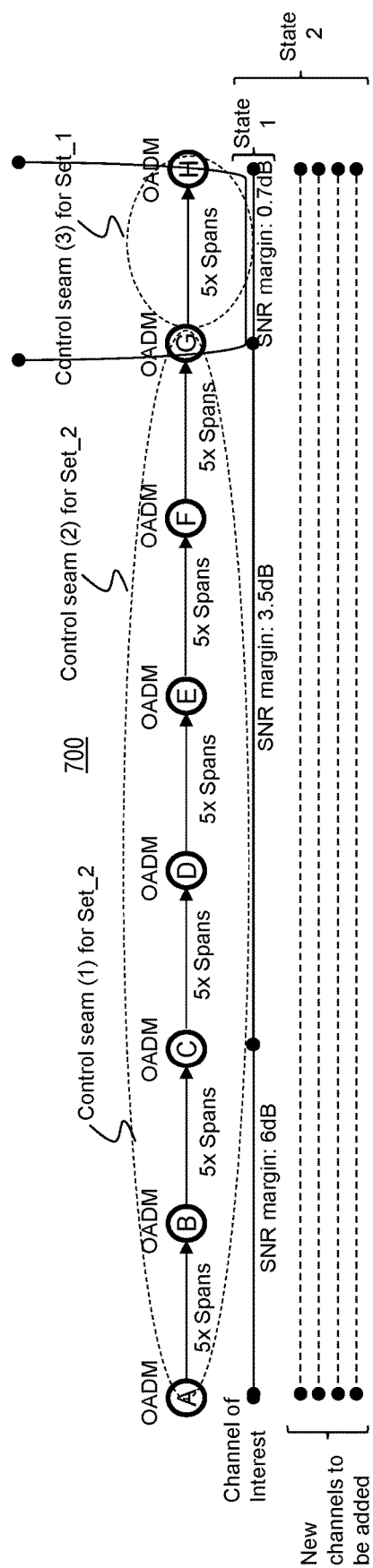
FIGS. 15A and 15B are a diagram illustrating the network with different logical control seams and a graph of different controller speeds based on required SNR margin versus number of spans.
Figure 15B:
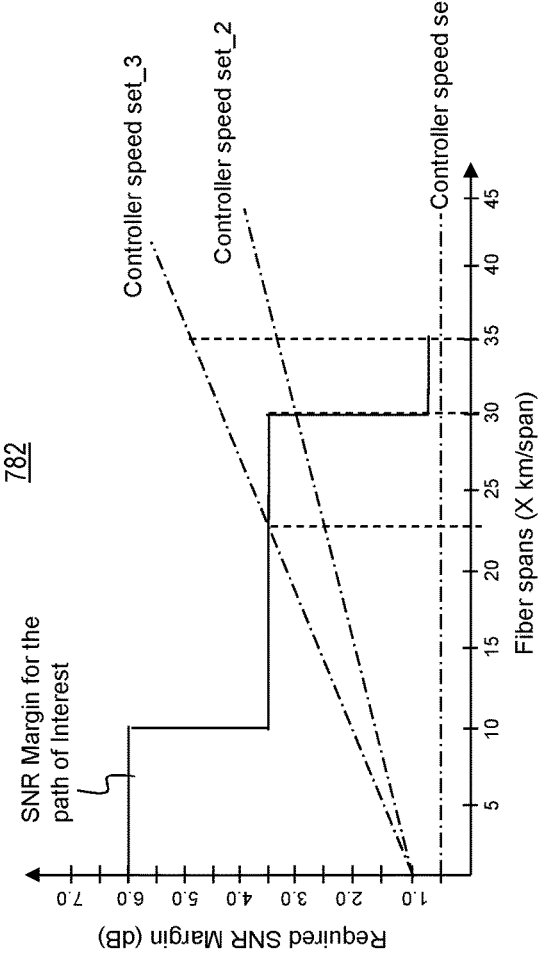

Referring to FIGS. 15A and 15B, a diagram illustrates the network 700 with different logical control seams and a graph 782 of different controller speeds based on required SNR margin versus number of spans. Here, the graph 782 is similar to the graph 760 in FIG. 13. In this example, the minimum margin available for any channel in the path is 0.7 dB, which also decides the end-to-end path margin. Typically, with the available margin, the conventional approach allows only controller speed settings set_1 for a total action time with Set_1=140 s. However, margin available end-to-end of the path is not the same due to different channel population as shown in the graph 782. In this example, the path has 6 dB of SNR margin up to 10× spans, and a minimum of 3.5 dB of SNR margin from $11^{th}$ to $30^{th}$ span. From $31^{st}$ to $35^{th}$ span, the available margin is only 0.7 dB.

With the process 750, the end-to-end path can be divided, for example, into 2× logical control seams to get a speed settings of Set_2 and Set_1. Achievable capacity change time will be:

Seam (1): 30× spans; 6× sections; Set_2; 4 s/Section=24 s
Seam (2): 5× spans; 1× section; Set_1; 20 s/Section=20 s
Estimated overhead to optimize each seam before starting action to next=16 s
Total action time with Set_2&1=24+20+16=60 s It is also possible to divide the path into 3× logical seams to get a speed settings of Set_3, Set_2, and Set_1. Achievable capacity change time will be:

Seam (1): 20× spans; 4× sections; et_3; 5 s irrespective of section count=5 s
Seam (2): 10× spans; 2× sections; Set_2; 4 s/Section=8 s
Seam (3): 5× spans; 1× section; Set_1; 20 s/Section=20 s Estimated overhead to optimize each seam before starting action to next=16 s Total action time with Set_3&2&1=5+8+20+(3−1)*16=65 s;

With the process 750, it appears controller speed set_2&1 will provide the best capacity add time in this example (60s, compared to 140 s or 68 s (Set_3&2&1)).

Figure 16:
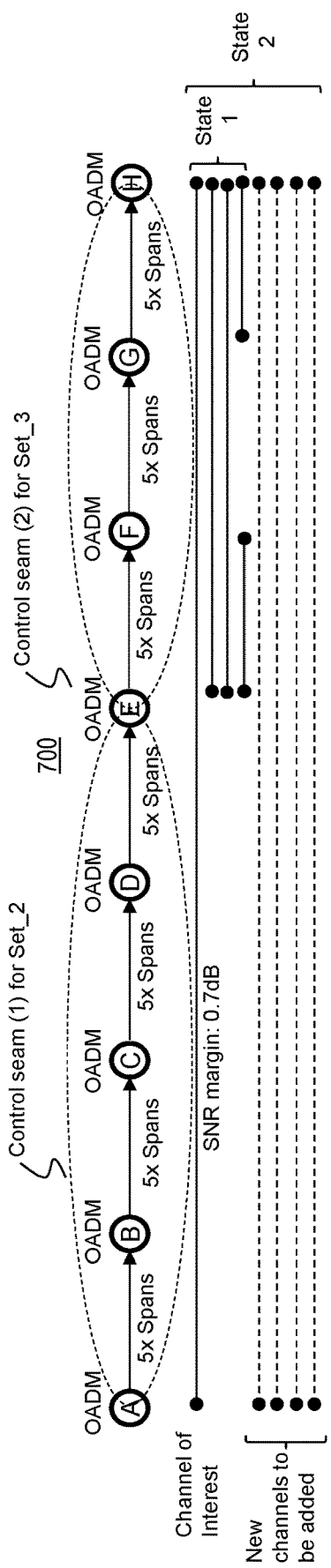
FIG. 16 is a diagram illustrating the network again with different logical control seams.

Referring to FIG. 16, a diagram illustrates the network 700 again with different logical control seams. In this example, the minimum margin available for any channel in the path is 0.7 dB, which also decides the end-to-end path margin. Again, with the available margin, the prior method allows only controller speed settings set_1 with a total action time with Set_1=140 s. However, due to different channel population along the path, the amount of power offsets created by any control speed settings will not linearly increase along the path. In this example, up to 20× spans, due to lack of channel population, the sensitive channel of interest will not be able to tolerate larger power offsets from other high speed control settings. However, a higher speed control settings can be used after 20th span just because the mesh channel presence will create less power offsets and hence less margin impact on the in-service channel of interest.

In this example, it is possible that with the given spectral loading condition, both control speed settings Set_2 and Set_3 will exhibit very similar power offsets and will be able to keep the overall margin impact<=available path margin (see the graph 780 for two controller speed settings). That means for the given path, it will be possible to set_2× control seams with Set_1 and Set_3. Achievable capacity change time will be:

Seam (1): 20× spans; 4× sections; Set_1; 20 s/Section=80 s

Seam (2): 15× spans; 3× sections; Set_3; 5 s irrespective of section count=5 s

Estimated overhead to optimize each seam before starting action to next=16 s

Total action time with Set_1&3=80+16+5=101 s.

Figure 17:
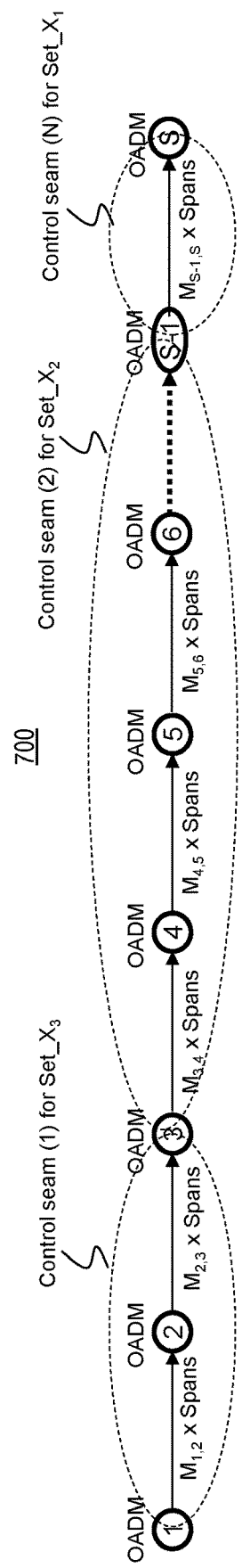
FIG. 17 is a diagram illustrating the network again with different logical control seams for describing overall add time with the process of FIG. 12.

Referring to FIG. 17, a diagram illustrates the network 700 again with different logical control seams for describing overall add time with the process 750. The Total Time to Add in any path, $$T_{total} = \sum_{i=1}^{N} T_{Xn} + \sum_{i=1}^{N-1} T_{ov,i},$$

where $T_{Xn}$ is the time to add in each control seam at a given control speed or controller settings Xn, where X1, X2, . . . , Xn are different controller settings; and $T_{ov,i}$ is the overhead time between two consecutive control seams, where i=1, 2, . . . , N are different control seams, each with different control settings. Overhead is the time to minimize power offset after add actions in each control seam. Since the actions in each control seam does not violate the available path margin, no timing overhead needs to be allocated after action is completed on the last control seam.

Dynamics of Channel Population Per Span

Figure 18:
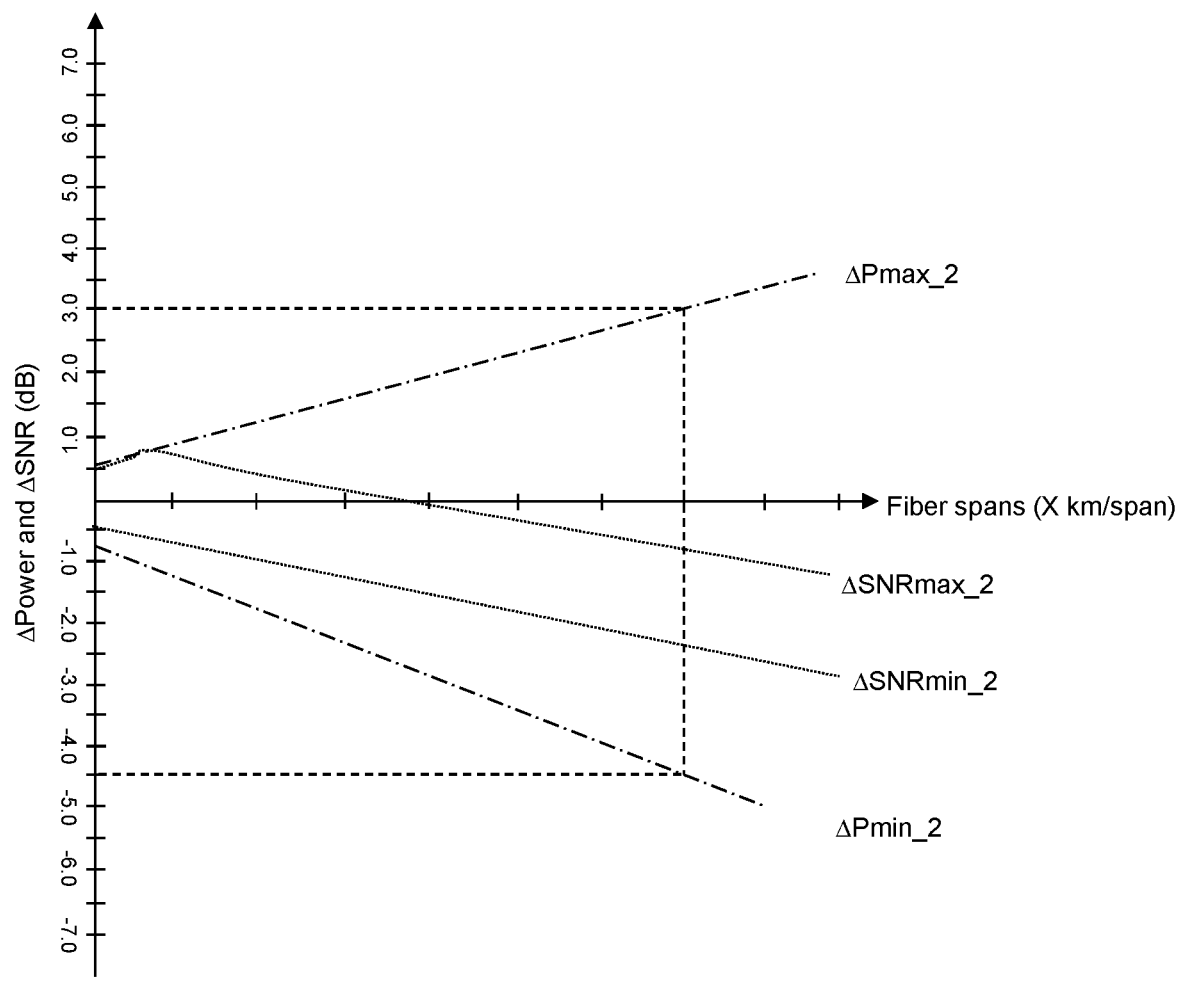
FIG. 18 is a graph illustrating delta power and SNR changes created by different control speeds on existing photonic services for a given spectral loading in a path.

Referring to FIG. 18, a graph illustrated delta power and SNR changes created by different control speeds on existing photonic services for a given spectral loading in a path. A (+ve) ΔP indicates an overshoot in launch power to fiber for existing photonic services that will result in more non-linear penalties and hence, an impact on SNR margin. A (−ve) ΔP indicates an undershoot in launch power to fiber for existing photonic services that will result in more OSNR reduction and hence, impacts the overall (electrical) SNR margin. The graph in FIG. 18 indicates how much perturbation the in-service channels will see for a given or worst case spectral loading condition if the same control speed is maintained for new channel additions all the way along the path. For example, if the control speed settings set_2 is maintained for up to 35× spans, the in-service channels may experience a max of +3 dB overshoots to −4.5 dB undershoots to fiber launch power based on their spectral location that will cost around ~0.9 dB to ~2.2 dB additional SNR penalty. If the spectral loading condition changes along the path, the amount of perturbation created by a control speed will change significantly as well.

Figure 19A:
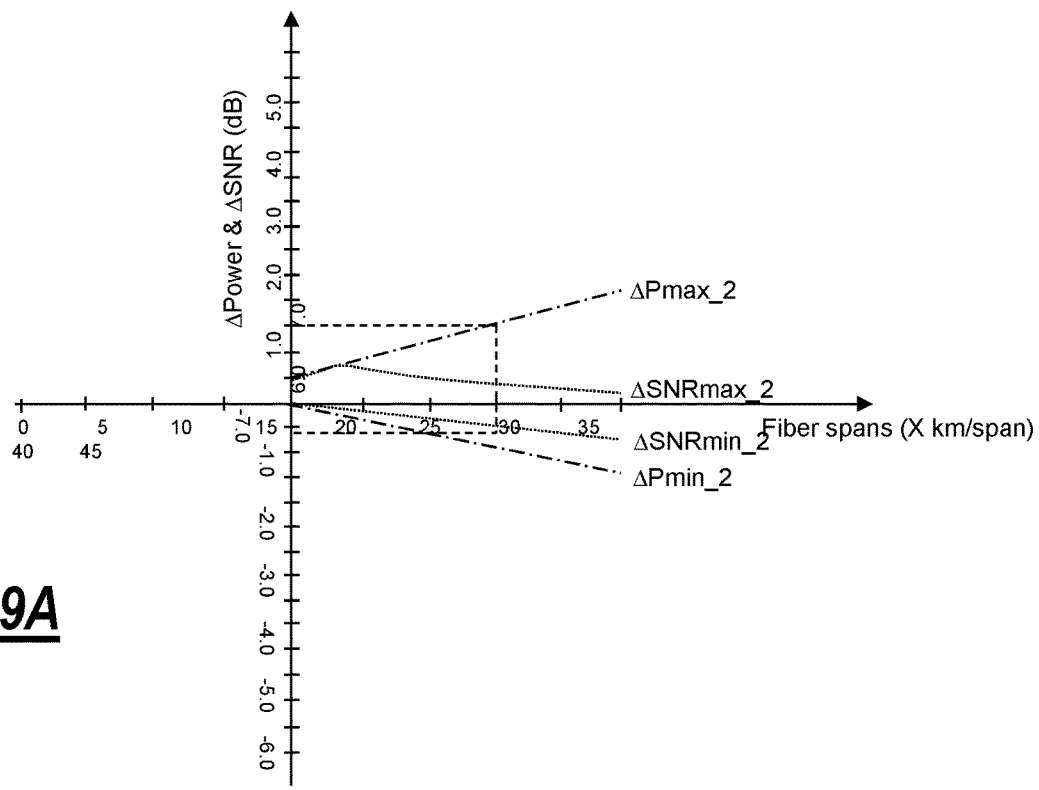
FIGS. 19A and 19B are graphs illustrating delta power and SNR changes created by different control speeds on existing photonic services, namely estimated power and SNR impact with two control speed settings if used after $20^{th}$ span in the previous example of FIG. 18.
Figure 19B:
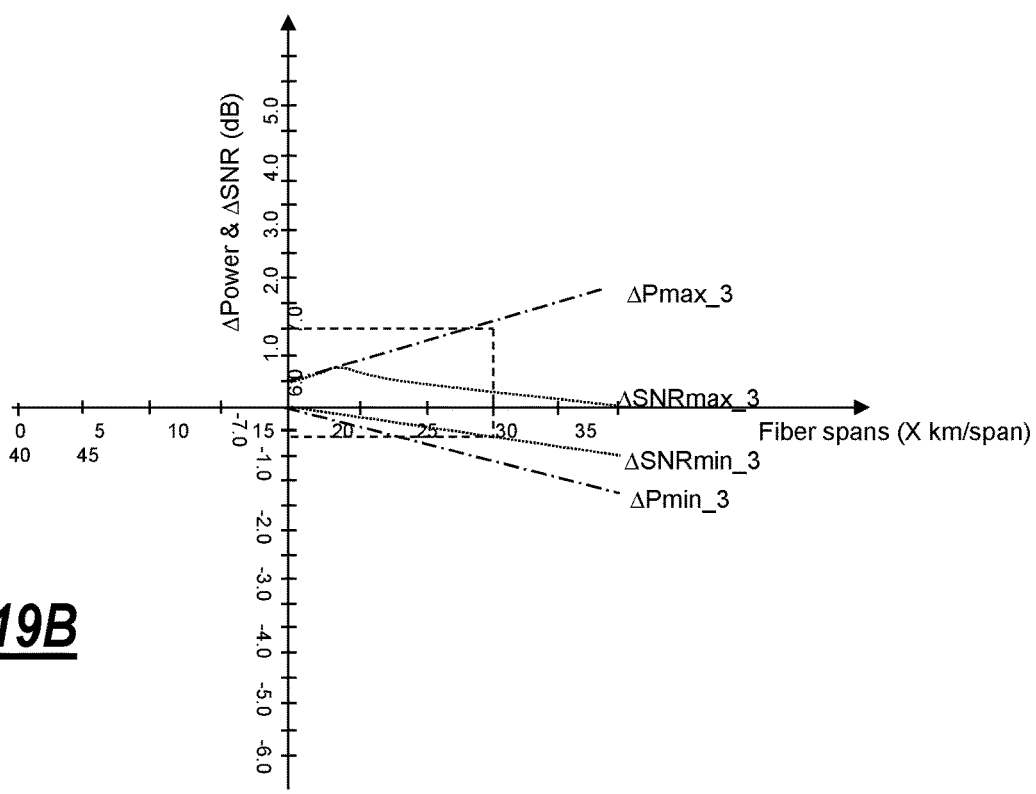

Referring to FIGS. 19A and 19B, graphs illustrated delta power and SNR changes created by different control speeds on existing photonic services, namely estimated power and SNR impact with two control speed settings if used after $20^{th}$ span in the previous example of FIG. 18. Here, FIG. 19A covers up to the $20^{th}$ span whereas FIG. 19B covers the $20^{th}$ span to the $35^{th}$ span.

Heuristic

Figure 20:
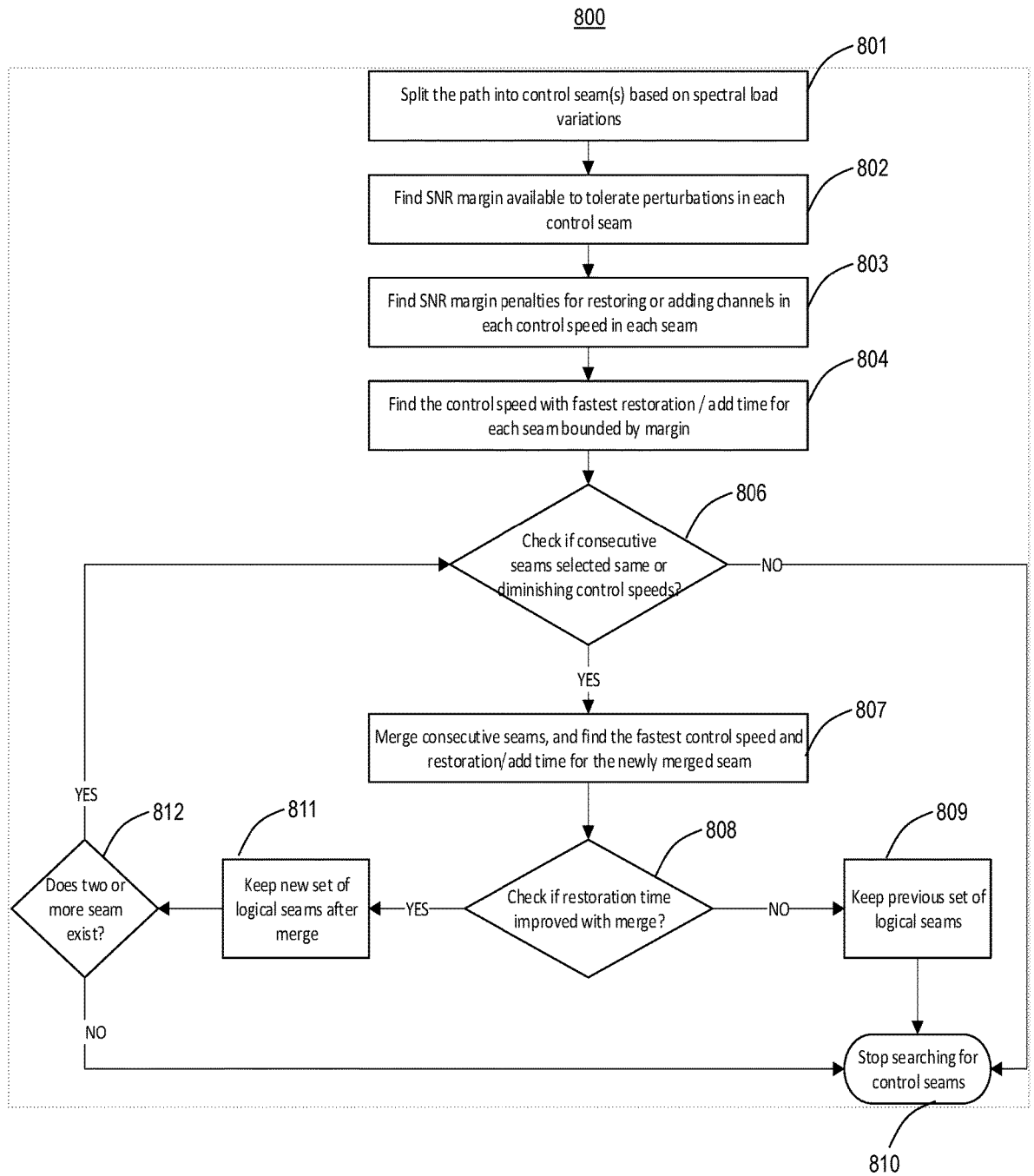
FIGS. 20 and 21 are flowcharts illustrating processes for a heuristic approach to search for logical control seams.
Figure 21:
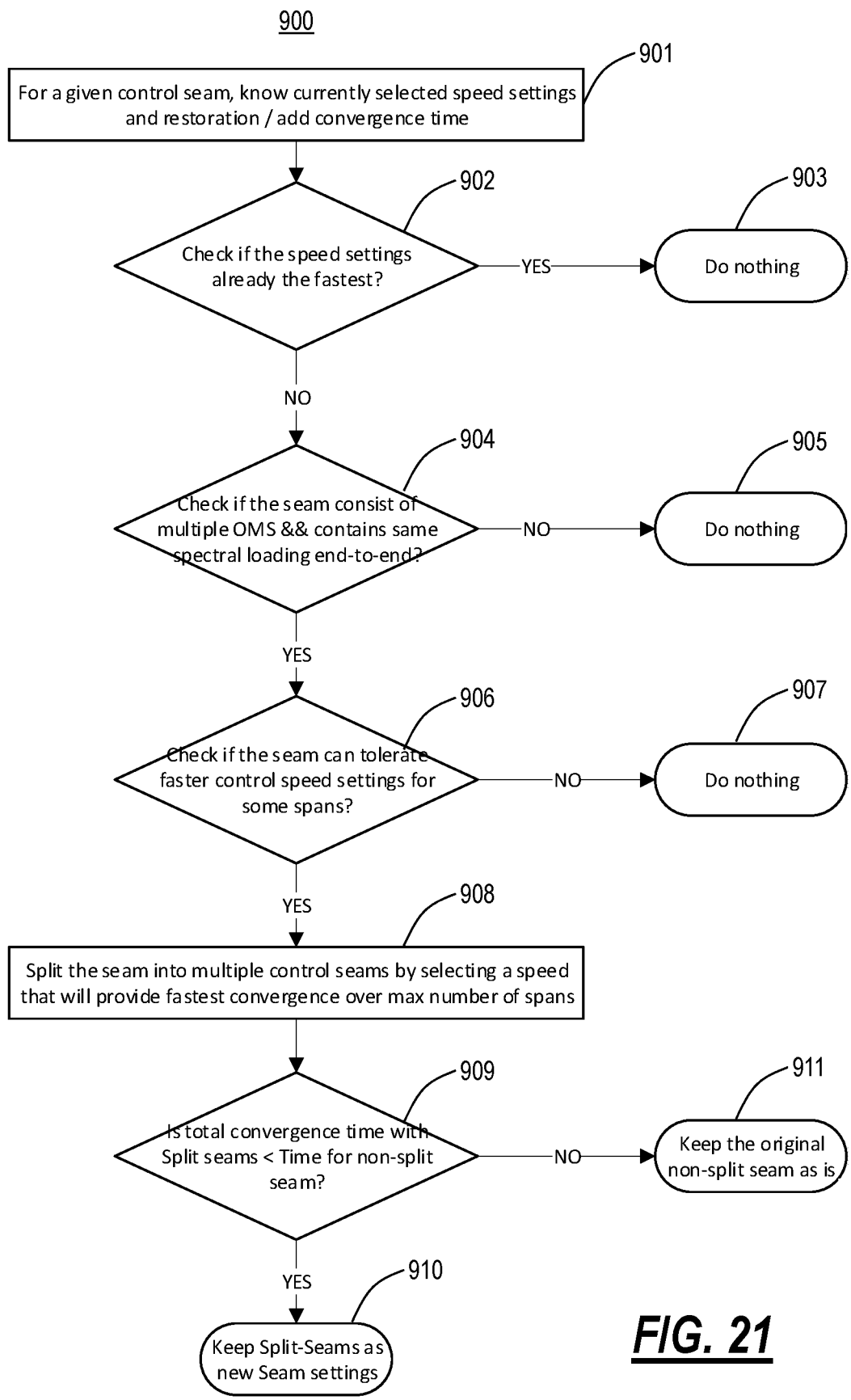

Referring to FIGS. 20 and 21, flowcharts illustrate process 800, 900 for a heuristic approach to search for logical control seams. Again, as described herein, there is a cost for segmenting a path into a plurality of logical control seams, namely the overhead time between each logical control seams. Thus, the selection of any boundary should enable a faster controller speed to make up for the overhead time.

In an embodiment, the logical control seams are set considering channel population (or spectral loading) variations along the path to select the fastest control speed by considering the SNR impact created by each control speed setting for that channel population within that seam. A mesh channel presence (such as spectrally distributed or mostly centered in the mid-part of the spectrum) will allow to take higher speed settings for controllers compared to low channel count conditions located at sensitive spectral locations (such as either at the highest or the lowest frequency end or at spectral hole region).

If two or more seams are running the same or diminishing control speed settings (i.e. faster to slower speed), check if those seams can be further merged_to get a control speed that will provide shorter restoration (channel add) time for the merged seam. For example, a merged seam is faster than split seams considering the overhead time. This covers previously described examples in FIGS. 15A and 16.

If channel population within a control seam is exactly the same, then the available SNR margin (over number of spans) within the seam is going to be fairly constant, and the margin penalties from different control speed settings is going to be fairly linearly increasing. Here, check if the control seam can be split into multiple logical control seams to have variable speed settings. Again, any logical control seam has to have a boundary at an OADM, i.e., an optical multiplex section (OMS) boundary. Also, the logical control seam has to include multiple optical multiplex sections (as without that variable speeds cannot be applied).

A heuristic can include to check if a logical control seam can tolerate faster control speed settings for some spans (bounded by sections), i.e., if the available margin curve over number of spans for the seam is intersecting with penalty curves of other faster control speed settings. If yes, split the logical control seam into multiple logical control seams based on the intersection of available margin and penalty curve of each control speed and select the speed settings that will give the fastest convergence time over maximum number of spans. This is described in FIG. 14A.

In FIG. 20, the process 800 provides a technique to find logical control seams on a path that has one or more channels being added thereto. The process 800 includes splitting a path into logical control seams(s) based on spectral load variations (step 801). For example, one approach is to have a logical control seam for all OMSs that have the same channel loading. Another approach would be to have a logical control seam for all OMSs within a certain margin requirement.

The process 800 includes finding SNR margin available to tolerate perturbations in each logical control seam (step 802) and finding SNR penalties for restoring or adding the one or more channels at each control speed in each logical control seam (step 803). The process 800 includes finding the control speed for the fastest restoration (add time) for each logical control seam bounded by margin (step 804).

The process 800 includes checking if any consecutive logical control seams have the same or diminishing control speeds (step 806). Here, consecutive means adjacent in the path. If so, the process 800 includes merging the consecutive logical control seams, and finding the fastest control speed for the fastest restoration (add time) for the newly merged logical control seam (step 807).

The process 800 includes checking if the restoration time is improved based on the newly merged logical control seam (step 808). If not, the process reverts to the previous set of logical control seams (step 809) and ends (step 810). The process 800 also ends after step 806 of there are no consecutive logical control seams that have the same or diminishing control speeds.

If the restoration time is improved based on the newly merged logical control seam (step 808), the process 800 maintains the newly merged logical control seam (step 811) and checks if more seams exists (step 812). If there are more seams, the process 800 returns to step 806, otherwise the process 800 ends (step 810).

In FIG. 21, the process 900 includes, for a given logical control seam, having the currently selected speed settings and restoration/add convergence time (step 901). If the currently selected speed settings are already the fastest (step 902), the process 900 ends (step 903). If not, if the logical control seam includes multiple OMS sections and has the same spectral loading end-to-end (step 904), the process 900 ends (step 905). If not, if the logical control seam cannot tolerate faster control speed settings for some spans (step 906), the process 900 ends (step 907). If not, the process 900 includes splitting the logical control seam into multiple logical control seams by selecting a speed that will provide the fastest convergence over a maximum number of span (step 908).

The process 900 includes checking if the convergence time with the split logical control seams is less than that of the non-split logical control seams (step 909). If so, the process includes keeping the split logical control seams (step 910), otherwise the original non-split logical control seams are maintained (step 911).

Logical Control Seam Process

Figure 22:
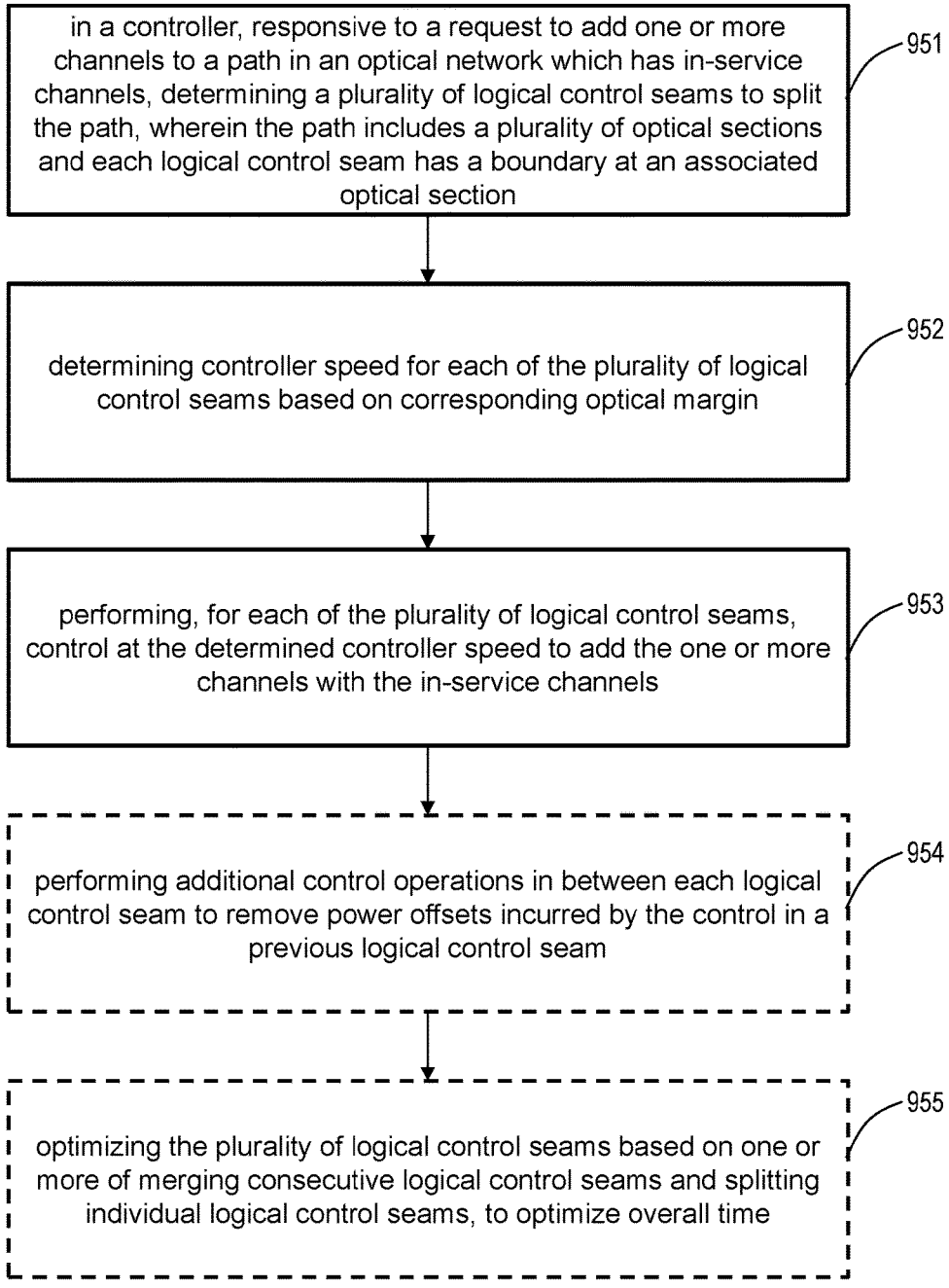
FIG. 22 a flowchart illustrating a process for logical control seams to control adding one or more channels to a path in an optical network.

Referring to FIG. 22, a flowchart illustrates a process 950 for logical control seams to control adding one or more channels to a path in an optical network. The process 950 is performed in a controller and includes, responsive to a request to add one or more channels to a path in an optical network which has in-service channels, determining a plurality of logical control seams to split the path, wherein the path includes a plurality of optical sections and each logical control seam has a boundary at an associated optical section (step 951); determining controller speed for each of the plurality of logical control seams based on corresponding optical margin (step 952); and performing, for each of the plurality of logical control seams, control at the determined controller speed to add the one or more channels with the in-service channels (step 953).

The process 950 can include performing additional control operations in between each logical control seam to remove power offsets incurred by the control in a previous logical control seam (step 954). The additional control operations have an overhead time, and the plurality of logical control seams are determined considering overall restoration time including the overhead time. The control of the plurality of logical control seams is performed in a sequence. The determined controller speed can be different for at least two logical control seams of the plurality of logical control seams. Each logical control seam is a maximum number of fiber spans in the path that can tolerate perturbations from a given control speed for channel additions or restorations without causing a traffic hit for the in-service channels in the path.

The process 950 can further include optimizing the plurality of logical control seams based on one or more of merging consecutive logical control seams and splitting individual logical control seams, to optimize overall time (step 955).

In another embodiment, a controller includes a network interface communicatively coupled to one or more nodes in an optical network; a processor communicatively coupled to the network interface; and memory storing instructions that, when executed, cause the processor to, responsive to a request to add one or more channels to a path in the optical network which has in-service channels, determine a plurality of logical control seams to split the path, wherein the path includes a plurality of optical sections and each logical control seam has a boundary at an associated optical section, determine controller speed for each of the plurality of logical control seams based on corresponding optical margin, and causing each of the plurality of logical control seams to perform control at the determined controller speed to add the one or more channels with the in-service channels.

In yet another embodiment, a non-transitory computer-readable storage medium storing instructions that, when executed, cause a processor to perform the steps associated with the process 950.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A controller comprising:
   a network interface communicatively coupled to one or more nodes in an optical network;
   a processor communicatively coupled to the network interface; and
   memory storing instructions that, when executed, cause the processor to
   responsive to a request to add one or more channels to a path in the optical network which has in-service channels, determine a plurality of logical control seams to split the path, wherein the path includes a plurality of optical sections and each logical control seam has a boundary at an associated optical section,
   determine controller speed for each of the plurality of logical control seams based on corresponding optical margin, and
   causing each of the plurality of logical control seams to perform control at the determined controller speed to add the one or more channels with the in-service channels.

2. The controller of claim 1, wherein the memory storing instructions that, when executed, further cause the processor to
   perform additional control operations in between each logical control seam to remove power offsets incurred by the control in a previous logical control seam, before initiating actions to the next control seam.

3. The controller of claim 2, wherein the additional control operations have an overhead time, and wherein the plurality of logical control seams are determined considering overall restoration time including the overhead time.

4. The controller of claim 1, wherein the plurality of logical control seams are performed in a sequence.

5. The controller of claim 1, wherein the determined controller speed is different for at least two logical control seams of the plurality of logical control seams.

6. The controller of claim 1, wherein each logical control seam is a maximum number of fiber spans in the path that can tolerate perturbations from a given control speed for channel additions or restorations without causing a traffic hit for the in-service channels in the path.

7. The controller of claim 1, wherein the memory storing instructions that, when executed, further cause the processor to
   optimize the plurality of logical control seams based on one or more of merging consecutive logical control seams and splitting individual logical control seams, to optimize overall time.

8. The controller of claim 7, wherein the memory storing instructions that, when executed, further cause the processor to
   set the plurality of logical control seams in the path based on channel population variations along the path, and
   select a fastest control speed, for an associated logical control seam, by considering signal-to-noise ration impact created by each control speed setting for that channel population within the associated logical control seam.

9. The controller of claim 7, wherein the memory storing instructions that, when executed, further cause the processor to
   merge consecutive logical control seams running a same or diminishing control speed settings.

10. The controller of claim 7, wherein the memory storing instructions that, when executed, further cause the processor to
    split an associated logical control seam that has a plurality of optical sections and run a same channel population into the split control seams based on control speed settings that give a fastest convergence time over a maximum number of spans.

11. A method comprising:
    in a controller, responsive to a request to add one or more channels to a path in an optical network which has in-service channels, determining a plurality of logical control seams to split the path, wherein the path includes a plurality of optical sections and each logical control seam has a boundary at an associated optical section;
    determining controller speed for each of the plurality of logical control seams based on corresponding optical margin; and
    performing, for each of the plurality of logical control seams, control at the determined controller speed to add the one or more channels with the in-service channels.

12. The method of claim 11, further comprising
    performing additional control operations in between each logical control seam to remove power offsets incurred by the control in a previous logical control seam, before initiating actions on the next control seam.

13. The method of claim 12, wherein the additional control operations have an overhead time, and wherein the plurality of logical control seams are determined considering overall restoration time including the overhead time.

14. The method of claim 11, wherein the plurality of logical control seams are performed in a sequence.

15. The method of claim 11, wherein the determined controller speed is different for at least two logical control seams of the plurality of logical control seams.

16. The method of claim 11, wherein each logical control seam is a maximum number of fiber spans in the path that can tolerate perturbations from a given control speed for channel additions or restorations without causing a traffic hit for the in-service channels in the path.

17. The method of claim 11, further comprising
optimizing the plurality of logical control seams based on one or more of merging consecutive logical control seams and splitting individual logical control seams, to optimize overall time.

18. A non-transitory computer-readable storage medium storing instructions that, when executed, cause a processor to
responsive to a request to add one or more channels to a path in an optical network which has in-service channels, determine a plurality of logical control seams to split the path, wherein the path includes a plurality of optical sections and each logical control seam has a boundary at an associated optical section,
determine controller speed for each of the plurality of logical control seams based on corresponding optical margin, and
causing each of the plurality of logical control seams to perform control at the determined controller speed to add the one or more channels with the in-service channels.

19. The non-transitory computer-readable storage medium of claim 18, wherein the instructions that, when executed, further cause the processor to
perform additional control operations in between each logical control seam to remove power offsets incurred by the control in a previous logical control seam, before initiating actions on the next control seam.

20. The non-transitory computer-readable storage medium of claim 18, wherein the determined controller speed is different for at least two logical control seams of the plurality of logical control seams.

\* \* \* \* \*